United States Patent
Berkey et al.

[11] Patent Number: 6,044,191
[45] Date of Patent: Mar. 28, 2000

[54] DISPERSION MANAGED OPTICAL WAVEGUIDE

[75] Inventors: George E. Berkey, Pine City; Venkata A. Bhagavatula, Big Flats, both of N.Y.; Peter C. Jones, Wilmington, N.C.; Donald B. Keck, Big Flats; Yanming Liu, Horeheads, both of N.Y.; Robert A. Modavis, Santa Rosa, Calif.; Alan J. Morrow, Elmira, N.Y.; Mark A. Newhouse; Daniel A. Nolan, both of Corning, N.Y.

[73] Assignee: Corning Incorporated, Corning, N.Y.

[21] Appl. No.: 09/185,472

[22] Filed: Nov. 3, 1998

Related U.S. Application Data

[63] Continuation of application No. 08/584,868, Jan. 11, 1996, Pat. No. 5,894,537, which is a continuation-in-part of application No. 08/423,656, Apr. 13, 1995.

[51] Int. Cl.[7] ............................................. G02B 6/02
[52] U.S. Cl. ................................................. 385/123
[58] Field of Search ..................................... 385/123–128

[56] References Cited

U.S. PATENT DOCUMENTS

| | | | |
|---|---|---|---|
| 4,969,710 | 11/1990 | Tick et al. ................................ | 385/123 |
| 5,267,339 | 11/1993 | Yamaguchi et al. ..................... | 385/123 |
| 5,361,319 | 11/1994 | Antos et al. .............................. | 385/123 |
| 5,430,822 | 7/1995 | Shigematsu et al. .................... | 385/123 |
| 5,448,674 | 9/1995 | Vengsarkar et al. ..................... | 385/123 |
| 5,559,920 | 9/1996 | Chraplygy et al. ....................... | 385/23 |
| 5,613,028 | 3/1997 | Antos et al. .............................. | 385/123 |
| 5,673,354 | 9/1997 | Akasaka et al. ......................... | 385/127 |
| 5,778,128 | 7/1998 | Wildeman ................................. | 385/123 |
| 5,878,182 | 3/1999 | Peckham .................................. | 385/123 |

FOREIGN PATENT DOCUMENTS

| | | |
|---|---|---|
| 0627639 | 5/1994 | European Pat. Off. . |
| 1448080 | 9/1976 | United Kingdom . |

*Primary Examiner*—Akm E. Ullah
*Attorney, Agent, or Firm*—Robert L. Carlson; Timothy R. Krogh

[57] ABSTRACT

A single-mode optical waveguide fiber designed to limit power penalty due to four wave mixing and a method of making the waveguide is disclosed. Variations in properties, e.g., radius or refractive index, of the waveguide fiber core provide a total dispersion which varies along the length of the waveguide. The algebraic sum of products of length times total dispersion is controlled to a pre-selected value for each waveguide fiber which makes up a system link Proper choice of total dispersion variation magnitude and sub-length results in a system link wherein a signal travels only short distances in waveguide portions having total dispersion near zero. However, the variation of the total dispersion provides a system link which has a pre-selected dispersive effect on the signal over a selected wavelength range. The dispersive effect on the signal can be chosen to be essentially zero. A number of techniques for fabricating DM fiber are also disclosed.

20 Claims, 14 Drawing Sheets

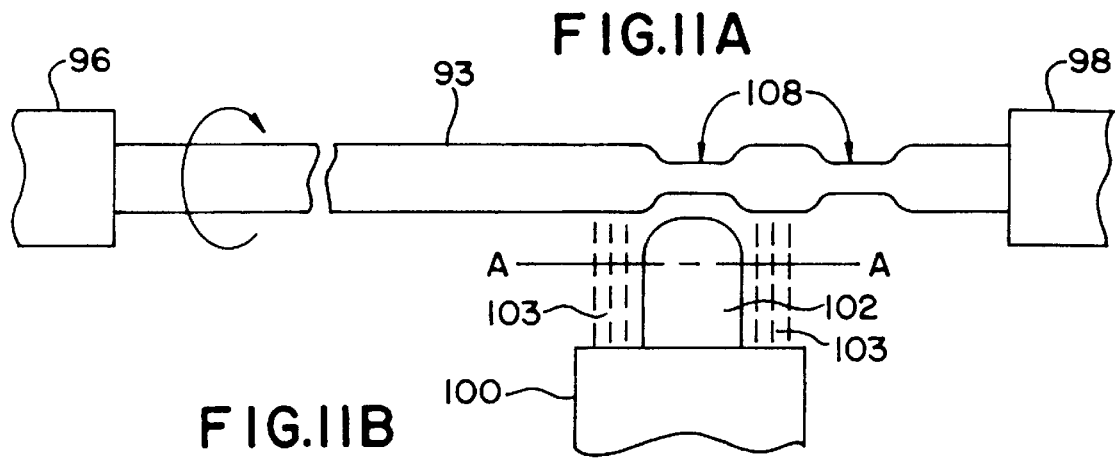
FIG.11A
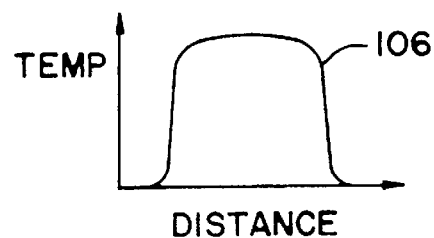
FIG.11B
FIG.12
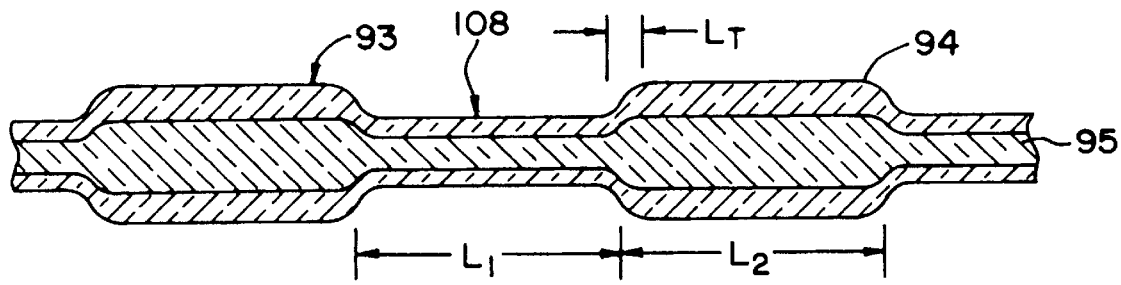
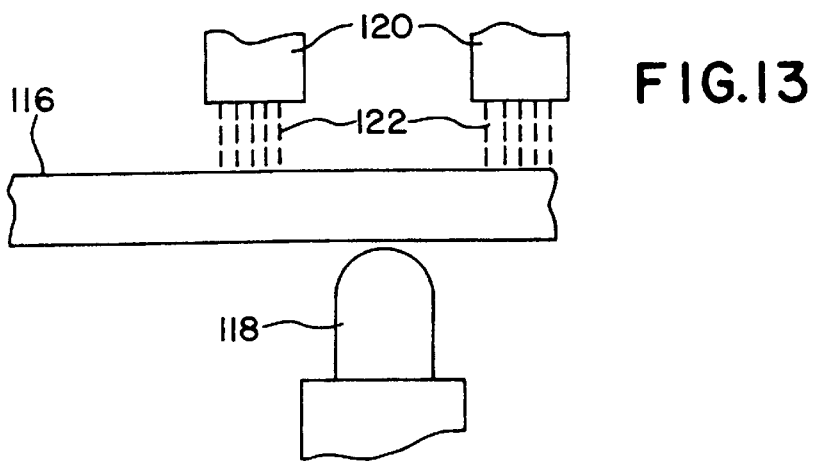
FIG.13

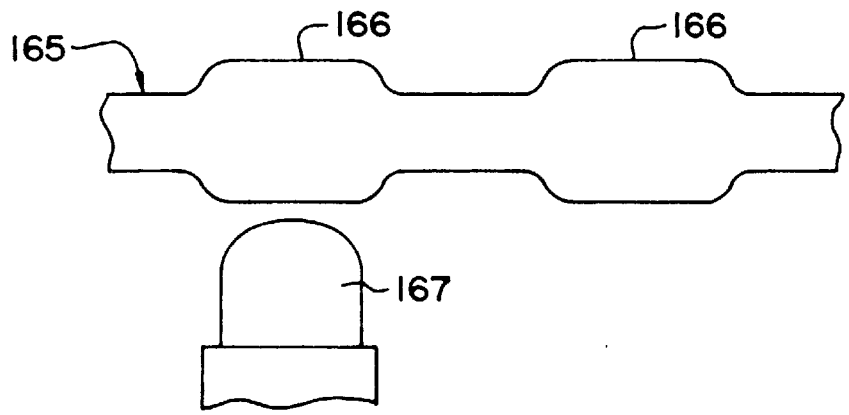
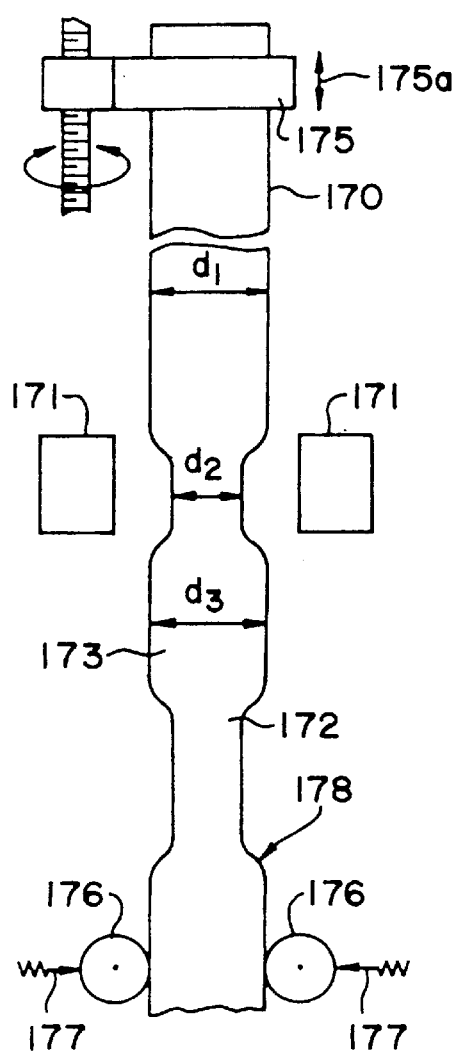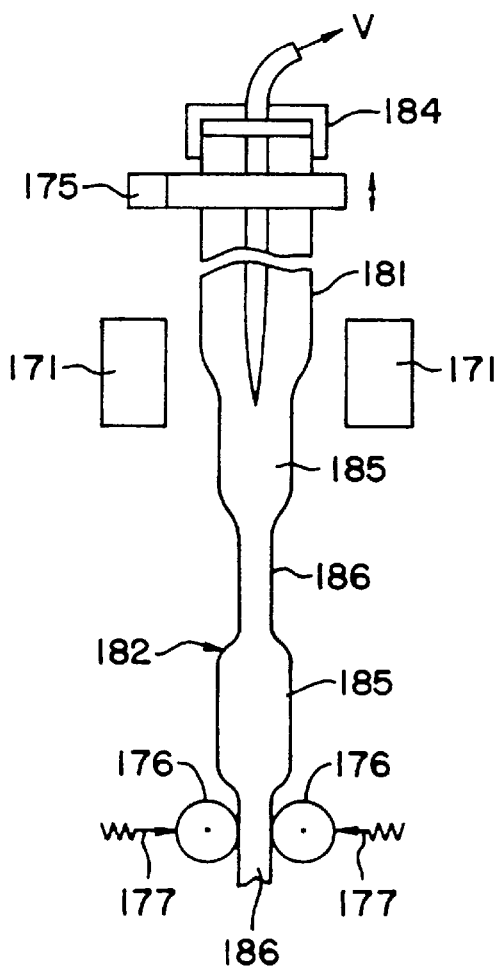

DISPERSION MANAGED OPTICAL WAVEGUIDE

RELATED APPLICATIONS

This application is a continuation of U.S. Pat. No. 5,894,537 filed on Jan. 11, 1996, which was granted the U.S. patent application Ser. No. 08/584,868. The application Ser. No. 08/584,868 is a continuation-in-part of U.S. patent application Ser. No. 08/423,656, filed Apr. 13, 1995. The content of all of the aforesaid applications are relied upon and incorporated herein by reference in their entirety. The benefit to priority under 35 U.S.C. § 120 is hereby claimed.

BACKGROUND

The invention is directed to a dispersion managed (DM) single-mode optical waveguide fiber and a method for making the inventive fiber The introduction into the telecommunications network of high powered lasers, optical amplifiers, multiple channel communications, and higher bit rates has resulted in the exploration of waveguide fiber designs which can minimize signal degradation due to non-linear waveguide effects.

Of particular interest is a waveguide design which can substantially eliminate four wave mixing. A dilemma arises in the design of a waveguide fiber to minimize four wave mixing while maintaining characteristics required for systems which have long spacing between regenerators. That is, in order to substantially eliminate four wave mixing, the waveguide fiber should not be operated near its zero of total dispersion, because four wave mixing occurs when waveguide dispersion is low, i.e., less than about 0.5 ps/nm-km. On the other hand, signals, having a wavelength away from the zero of total dispersion of the waveguide, are degraded because of the presence of the total dispersion.

One strategy proposed to overcome this dilemma, is to construct a system using cabled waveguide fiber lengths some of which have a positive total dispersion and some of which have a negative total dispersion. If the length weighted average of dispersion for all the cable segments is close to zero, the regenerator spacing can be large. However, the signal essentially never passes through a waveguide length where the dispersion is close to zero, so that four wave mixing is prevented.

The problem with this strategy is that each link between regenerators must be tailored to give the required length weighted average of dispersion. Maintaining cable dispersion identity from cabling plant through to installation is an undesirable added task and source of error. Further, the need to provide not only the proper dispersion, but also the proper length of cable having that dispersion, increases the difficulty of manufacture and leads to increased system cost. A further problem arises when one considers the need for replacement cables.

The present invention overcomes these problems by making each individual fiber a self contained dispersion managed system. A pre-selected, length weighted average of total dispersion, i.e., total dispersion product, is designed into each waveguide fiber. Thus, the cabled waveguide fibers all have essentially identical dispersion product characteristics, and there is no need to assign a particular set of cables to a particular part of the system.

Power penalty due to four wave mixing is essentially eliminated, or reduced to a pre-selected level, while total link dispersion is held to a pre-selected value, which may be a value substantially equal to zero.

DEFINITIONS

"Dispersion" refers to pulse broadening and is expressed in ps/nm-km.

"Dispersion Product" refers to dispersion times length and is expressed in ps/nm.

"Phase Mismatch" refers to the difference in phase among the interacting waves of different center wavelengths which may interact via four wave mixing.

A "Period" is the waveguide fiber length which encompasses a sub-length having positive dispersion, a sub-length having negative dispersion and a transition length over which the dispersion changes from the positive to the negative dispersion value.

An "Oscillation Length" is either the positive or negative dispersion sub-length of a period. Where there is no sign associated with oscillation length, the positive and negative oscillation lengths are taken as equal.

The phase mismatch is proportional to the dispersion product. Also, the accumulated phase mismatch is proportional to the sum of dispersion products. Thus in FIGS. 6–7, the unifying principle of the power penalties shown is that each of the power penalties varies as the accumulated phase mismatch among signals varies. As phase mismatch becomes larger, the power penalty decreases.

Hence, FIGS. 6–7 may be best understood by regarding them as illustrative of the relation of phase mismatch to total dispersion and oscillation length. An alternative statement is, FIGS. 6–7 show the dependence of power penalty on phase mismatch, where phase mismatch has been expressed in terms of distinct measurable waveguide fiber characteristics, i.e., total dispersion and oscillation length.

The "Signal Separation" is expressed as the frequency separation of adjacent multiplexed signals on the waveguide fiber. For example systems contained in this document, the signal separation is 200 GHz.

SUMMARY OF THE INVENTION

The present invention meets the need for a waveguide fiber length wherein total dispersion product is controlled to a pre-selected value which meets a system link requirement. Each waveguide fiber is interchangeable with any other waveguide fiber designed for that system link. Thus, no particular arrangement of cable lengths and total individual cable dispersions, in a link, is needed to meet the link requirements.

A first aspect of the invention is a single-mode waveguide fiber having a core region surrounded by a cladding layer. The core region is characterized by a refractive index profile, which is the expression of the refractive index at each point along the core radius. In order to guide light in the core region, at least a part of the core refractive index profile must be greater than the clad index. For most applications, the clad has a substantially flat index, although some advantageous designs have been found wherein the clad layer has a non-constant profile.

In this first aspect, the dispersion of the inventive fiber is made to vary between a range of positive values and a range of negative values along the waveguide length. The dispersion product, expressed as ps/nm, of a particular length, l, is the product (D ps/nm-km*l km). A positive number of ps/nm will cancel an equal negative number of ps/nm. In general, the dispersion associated with a length $l_i$ may vary from point to point along $l_i$. That is, the dispersion $D_i$ lies within a pre-determined range of dispersions, but may vary from point to point along $l_i$. To express the contribution of $l_i$ to the dispersion product, expressed in ps/nm, $l_i$ is made up of segments $dl_i$ over which the associated total dispersion $D_i$ is essentially constant. Then the sum of products $dl_i*D_i$ characterizes the dispersion product contribution of $l_i$. Note that, in the limit where $dl_i$ approaches zero, the sum of products $dl_i*D_i$ is simply the integral of $dl_i*D_i$ over the length $l_i$. If the dispersion is essentially constant over sub-length $l_i$, then the sum of products is simply $l_i*D_i$.

The dispersion of the overall waveguide fiber length is managed by controlling the dispersion $D_i$ of each segment $dl_i$, so that the sum of the products $D_i*dl_i$ is equal to a pre-selected value appropriate to a particular system design.

Because this waveguide design reaches its full potential in a multiplexed system, in one embodiment, the sum of products is controlled to a pre-selected value over a wavelength range wherein signals may be multiplexed.

For high rate systems, having long regenerator spacing, the wavelength range in the low attenuation window from about 1525 nm to 1565 nm may be advantageously chosen. In this case, a preferred embodiment would have the sum of products targeted at zero over that range of wavelengths.

The $D_i$ magnitudes are held above 0.5 ps/nm-km to substantially prevent four wave mixing and below about 20 ps/nm-km so that overly large swings in the waveguide fiber parameters are not required.

Also the length over which a given total dispersion persists is generally greater than about 0.1 km. This lower length limit reduces the power penalty, (see FIG. 7), and simplifies the manufacturing process.

The period of a DM single-mode waveguide is defined as a first length having a total dispersion which is within a first range, plus a second length having a dispersion which is in a second range, wherein the first and second ranges are of opposite sign, plus a length over which the dispersion makes a transition between the first and second range. These three lengths need not be adjacent, because the quantity being controlled is the sum of $D*dl$ products over an entire fiber length. However, for ease of process control, the three lengths are generally arranged as a first length, an adjacent transition length, followed by a second length adjacent the transition length. To avoid four wave mixing and any associated power penalty over the transition length, it is advantageous to keep the part of the transition length which has an associated total dispersion less than about 0.5 ps/nm-km as short as possible, preferably less than about 500 meters per transition and preferably no more than 10% of the period.

The dispersion of a waveguide length can be changed by a plurality of methods including varying waveguide geometry, waveguide refractive index, waveguide refractive index profile, or waveguide composition. In one embodiment, a core preform, made by any of the processes known to those of ordinary skill in the art, may be processed to have sections of reduced diameter. The reduction can be done by any of several methods such as heating and stretching one or more sections of the preform or by removing annular regions of the preform by a mechanical technique such as grinding and polishing, a chemical technique such as acid etching and polishing, or an energy bombardment technique such as laser ablation. The resulting core preform is then overcladded, by any of several methods, including soot deposition or use of overcladding tubes, to form a draw blank or preform having a uniform, substantially cylindrical outer surface.

In a method similar to that described above, a core preform is processed to have sections of increased diameter. The core preform can be heated, and regions of the preform on opposite sides of the heated region can be traversed toward the heated region to enlarge or bulge the heated region. The resulting core preform is then overcladded to form a draw preform.

When the draw blank is drawn to a fiber of uniform diameter, the waveguide core radius will be reduced over lengths corresponding to the reduced radius lengths in the core preform. A diameter reduction of about 5% to 25% is sufficient to produce the desired positive to negative dispersion variation. The 25% reduction would be needed only in cases where the absolute value of total dispersion is about 20 ps/nm-km. A range of radii variation of 5% to 10% is, in general, sufficient for most applications. As before, the quantity controlled is the sum of products $D_i*dl_i$ and $D_j*dl_j$, where $D_i$ is a total dispersion corresponding to a reduced radius $r_i$, which lies within a first range of values, and $D_j$ is a total dispersion corresponding to an unreduced radius $r_j$ which falls within a second range of values. $D_i$ and $D_j$ are of different algebraic sign in the operating wavelength range.

The core diameter variations may also be obtained by reducing segments of the diameter of a draw preform or blank, having a substantially uniform diameter core portion, and then drawing the preform to a waveguide fiber having a uniform outer diameter. The waveguide core will have segments of decreased diameter corresponding to draw preform segments for which the diameter was not reduced.

In another embodiment, the refractive index of the fiber core is varied along the waveguide length. The refractive index may be changed by irradiating the fiber with radiation in the electromagnetic spectrum, or bombarding the waveguide with sub-atomic particles such as electrons, alpha particles or neutrons. Each particle is characterized by its corresponding DeBroglie wavelength. One may thus describe particle bombardment as irradiation with a particular DeBroglie wavelength. A preferred way to cause a variation in core index is to irradiate the waveguide fiber with ultraviolet light. Due to the nature of the polymer coating materials used to protect the waveguide fiber, the ultraviolet irradiation is done after the fiber has passed out of the hot zone of the furnace, and before it has received a polymer coating. An index difference of as low as $5 \times 10^{-6}$ can serve to limit four wave mixing. An index difference greater than about $1.0 \times 10^{-3}$ is preferred.

The varying refractive index produces a varying total dispersion which allows the sum of products of $D_i*dl_i$ and $D_j*dl_j$ to be controlled. $D_i$ is a total dispersion corresponding to a first refractive index range. $D_j$ is a total dispersion corresponding to a second refractive index range. $D_i$ and $D_j$ are of different algebraic sign.

Any of a large number of refractive index profiles provide the required flexibility for adjusting waveguide dispersion and thereby varying the total dispersion. These are discussed in detail in U.S. Pat. No. 4,715,679, Bhagavatula, and applications Ser. Nos. 08/323,795, 08/287,262, and 08/378,780.

A particular set of index profiles, which provides the properties necessary to the inventive waveguide, are those having a core region which includes a central portion, having a refractive index profile, and at least one annular portion, surrounding the central portion having a different refractive index profile. Optical fibers having this type of profile are referred to as segmented core fibers. The central portion may have an alpha profile, i.e., one which is described by the equation, $n(r)=n_o[1-\Delta(r/a)^\alpha]$, where n is refractive index, $n_o$ is maximum refractive index, r is the radial variable, a is fiber core radius, Δ is % refractive index and a is a number greater than zero. The term Δ is defined as $(n_1^2-n_2^2)/2n_1^2$, where $n_1$ is the maximum refractive index of a core region and $n_2$ is the refractive index of the clad glass layer.

In another embodiment, the index profile includes an essentially constant central portion, having a refractive index substantially equal to the clad glass refractive index and the adjacent annular index portion is a rounded step index. For simplicity and ease of manufacture an index profile having a constant central region and one annular rounded step index portion is preferred. The preferred embodiment of this simple index profile has a maximum index % Δ of about 1% and a ratio $a_1/a$ of about 0.5, where $a_1$ and a are defined in of FIG. 4.

Another aspect of the invention is a single-mode optical waveguide having a number of sub-lengths, $l_i$, which are made up of segments, $dl_i$, which have respective essentially constant associated dispersions, $D_i$, where the zeros of dispersion of the $D_i$ are within a first wavelength range. The remaining sub-lengths, $l_j$, which together with the $l_i$ and the transition lengths, make up the waveguide fiber length, are made up of segments $dl_j$, which have respective essentially constant associated dispersions $D_j$, and the dispersion zeros of the $D_j$ are within a second wavelength range which is disjoint from the first wavelength range. The common meaning of the term disjoint is that the two ranges have no values in common. The lengths and dispersions are chosen so that the algebraic sum of products $dl_i^*D_i$ and $dl_j^*D_j$ is a pre-selected value over a pre-determined wavelength range.

For a dispersion shifted waveguide fiber, a preferred pre-determined system operating range is about 1525 nm to 1565 nm. The first range for dispersion zeros is about 1570 nm to 1680 nm, and the second range is about 1480 nm to 1535 nm. In such a system the communication signals will substantially always travel in a waveguide fiber of non-zero dispersion, for example a total dispersion not less than about 0.5 ps/nm-km, thereby substantially preventing four wave mixing. However, the overall system total dispersion may be held essentially at zero, so that little or no signal degradation occurs due to total dispersion, i.e., material plus waveguide dispersion.

Yet another aspect of the invention is a method for making a DM waveguide fiber. A core preform is prepared having at least one sub-length of reduced diameter relative to the rest of the core preform. A clad layer is applied to provide a draw preform. The draw preform is then drawn into waveguide fiber having a substantially constant outer diameter. In keeping with the nominal specifications, the waveguide fiber is substantially free of. voids. The core of this waveguide will have a sub-length of reduced diameter corresponding to the preform sub-length of reduced diameter. The number, longitudinal extent and depth of the sub-lengths of reduced diameter are chosen so that the sum of the total dispersion times sub-length products equals a pre-selected value over a predetermined wavelength range. As above, if the total dispersion varies over a sub-length, the sub-length is made up of segments each having an associated, essentially constant, total dispersion and a characteristic total dispersion times length product.

An alternative process for introducing diameter variations is the reduction of the diameter of at least one sub-length of the draw blank, which is characterized as having a substantially uniform radial core dimension. Drawing the waveguide to a uniform diameter will again produce a core having diameter fluctuations. In this case the waveguide core diameter will be smaller in the corresponding draw preform sub-lengths which are not reduced in diameter.

The diameter reduction of either the core preform or draw preform may be carried out using any of several techniques known to those of ordinary skill in the art. These include the series techniques, grinding and polishing, etching and polishing or heating and stretching.

Alternatively, core diameter variations can be introduced into the core preform by heating sections of the core preform and urging portions of the core preform on opposite sides of the heated section toward the heated section to cause it to bulge.

As stated above it is advantageous to have reduced diameter waveguide core lengths greater than about 0.1 km. The amount of the reduction is preferably in the range of about 5% to 25% of the unreduced core diameter. As stated above a range of 5% to 10% is usually sufficient.

In an embodiment of the method which facilitates manufacturing, the sub-lengths of reduced diameter are evenly spaced along the core or draw preform to produce in the waveguide pairs of reduced and unreduced waveguide fiber sub-lengths, which are joined by a transition length over which the diameter changes from reduced to unreduced size, or vice versa. If the entire waveguide length is made up of such pairs, the overall total dispersion can be readily be targeted at zero.

The overall dispersion target may also be a value other than zero. The entire waveguide fiber length is formed of a number of sub-length pairs whose dispersions essentially cancel and an additional sub-length designed to have the targeted or pre-selected dispersion times length value.

Another aspect of the invention is a method of managing dispersion over a length of single-mode waveguide fiber, wherein the refractive index profile is increased, over at least one sub-length, by means of ultraviolet radiation so that a difference in total dispersion exists between irradiated and un-irradiated sub-lengths. The irradiating step is advantageously carried out after drawing but before coating of the waveguide. As mentioned above an index difference greater than about $1.0 \times 10^{-3}$ is preferred.

An irradiation scheme effective to reduce power loss due to four wave mixing is one wherein at least one pulse of ultraviolet light, having an energy flux of about 100 mJ/cm$^2$, delivered over a time in the range of about 10 to 20 ns, and, having a spot size of about 1 cm$^2$, is incident upon the fiber. That is, sufficient refractive index variation is produced in the waveguide fiber to reduce signal power loss due to four wave mixing.

BRIEF DESCRIPTION OF THE DRAWINGS

FIG. 11a illustrates a method of periodically reducing the diameter of sections of a core preform.

FIG. 11b is a temperature profile of the burner flame of FIG. 11a.

FIG. 12 is an enlarged cross-sectional view of the core preform of FIG. 11a.

FIG. 13 illustrates the cooling of regions of a core preform adjacent regions that are to be heated and stretched.

FIG. 19 illustrates that the core preform can be heated and bulged to periodically form regions of different diameter.

FIGS. 20–21 illustrate methods of drawing a core preform to periodically form regions of different diameter.

FIG. 24b is a longitudinal section of the essentially constant outer diameter waveguide which results from drawing the draw blank of FIG. 24a.

DETAILED DESCRIPTION OF THE INVENTION

The present invention is directed to a single-mode optical waveguide fiber wherein the total dispersion product, expressed as ps/nm, is managed over a waveguide length. The power penalty due to four wave mixing in a wavelength division multiplexed system can thus be largely avoided and the overall system dispersion can be maintained at a pre-selected value. For many long distance, large regenerator spacing, high data rate, multiplexed systems, the desired pre-selected value for total dispersion product is essentially zero.

By managing dispersion within each individual fiber, there is no need to select sets of waveguides which produce a substantially zero dispersion when joined together to form a link in a system. That is, because total dispersion product is managed in the individual waveguide fiber, the cables being installed to form a system are essentially identical in performance and therefore interchangeable.

Figure 1:
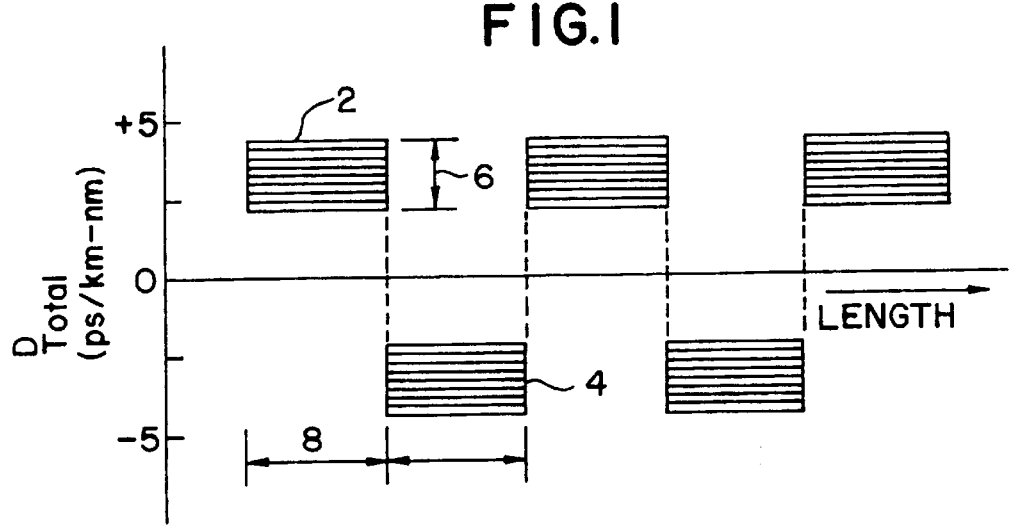
FIG. 1 is an illustration of total dispersion varying along the waveguide fiber length.

The total dispersion, expressed as ps/nm-km, is charted vs. waveguide length in FIG. 1. The total dispersion is seen to alternate between positive values 2 and negative values 4. Whereas FIG. 1 illustrates a plurality of sublengths exhibiting negative dispersion and a plurality of sublengths exhibiting positive dispersion, only one negative dispersion sublength and one positive dispersion sublength are required. The spread in total dispersion values indicated by line 6 illustrates that total dispersion varies with the wavelength of light propagated. The horizontal lines of the spread 6 represent total dispersion for a particular light wavelength. In general, the length of waveguide 8, characterized by a particular total dispersion, is greater than about 0.1 km. There is essentially no upper limit on length 8 except one which may be inferred from the requirement that the sum of products, length × corresponding total dispersion, is equal to a pre-selected value.

Figure 2:
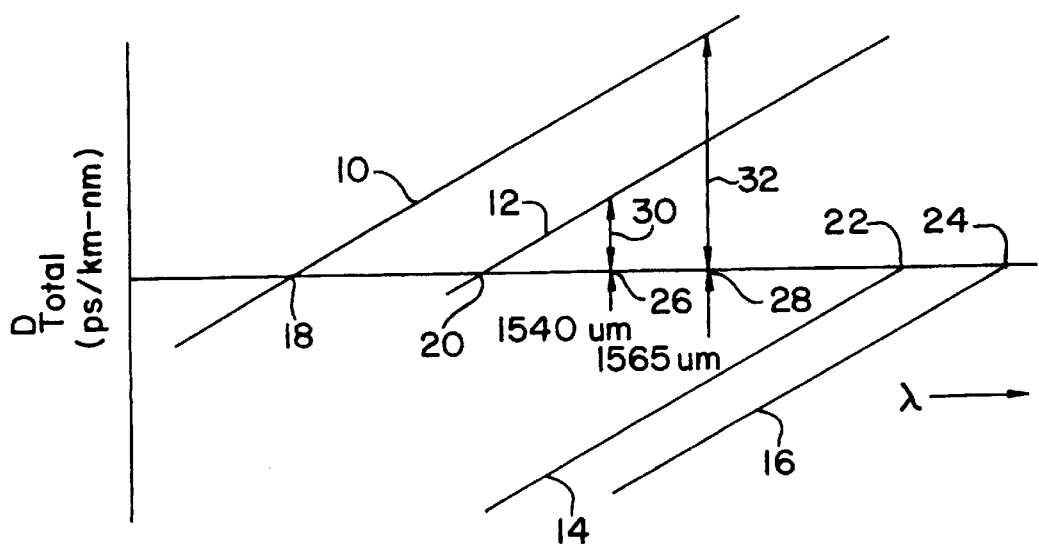
FIG. 2 shows how the zero dispersion of a waveguide fiber may vary to maintain total dispersion of the waveguide within a pre-selected range over a pre-determined wavelength window.

The chart of total dispersion vs. wavelength shown in FIG. 2 serves to illustrate design considerations for a DM single-mode waveguide fiber. Lines 10, 12, 14 and 16 represent total dispersion for four individual waveguide fibers. Over the narrow wavelength range considered for each waveguide, i.e., about 30 nm, the dispersion may be approximated by a straight line as shown. The wavelength range in which multiplexing is to be done is the range from 26 to 28. Any waveguide segment which has a zero dispersion wavelength in the range of 18 to 20 may be combined with a waveguide segment having a zero dispersion wavelength in the range 22 to 24, to yield a waveguide having a pre-selected total dispersion over the operating window 26 to 28.

Example Based on FIG. 2

Take the operating window to be 1540 n to 1565 nm. Assume that the single-mode waveguide fiber has a dispersion slope of about 0.08 ps/nm$^2$-km. Let line 30 be the 0.5 ps/nm-km value and line 32 the 4 ps/nm-km value. Apply the condition that the total dispersion within the operating window must be in the range of about 0.5 to 4 ps/nm-km.

A simple straight line calculation then yields zero dispersion wavelength range, 18 to 20, of 1515 nm to 1534 nm. A similar calculation yields a zero dispersion wavelength range, 22 to 24, of 1570 nm to 1590 nm. Algebraic addition of the total dispersion of waveguide fiber segments having dispersion zero within the stated ranges will yield a total dispersion between 0.5 and 4 ps/nm-km.

As described above the means for shifting zero dispersion wavelength include varying radius or % Δ along the core preform or draw preform length.

Figure 3:
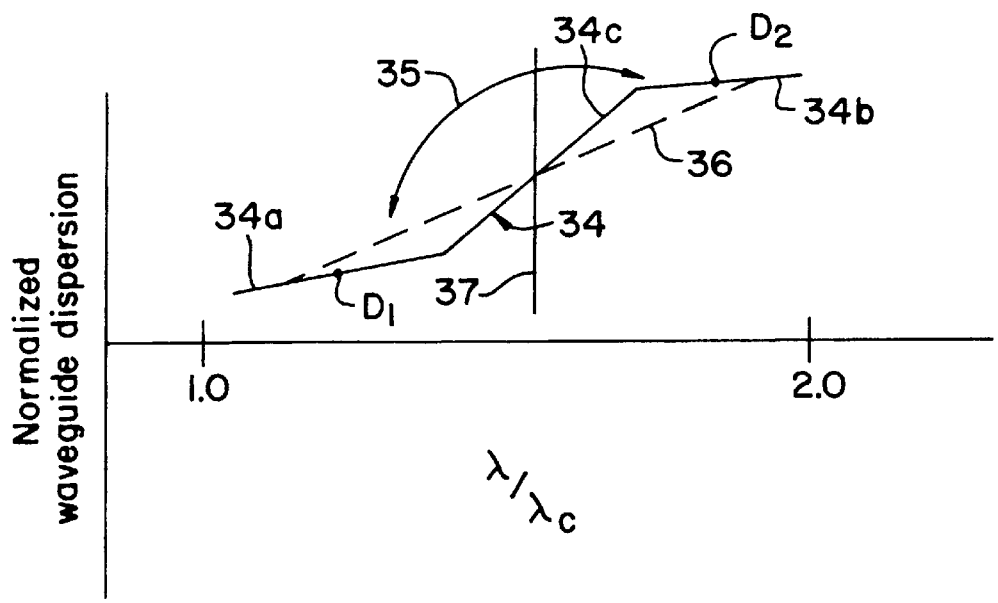
FIG. 3 is an illustration of a waveguide fiber having a bi-modal waveguide dispersion over a pre-selected wavelength range.

Model calculations have shown that bimodal waveguide dispersion curves like curve 34 in FIG. 3 are possible. Curve 34 corresponds to the refractive index profile represented by solid line 38 illustrated in FIG. 4. Fiber designs exhibiting bimodal dispersion are disclosed in U.S. patent application Ser. No. 08/287,262. Curve 34 includes relatively flat regions 34a and 34b and a relatively steep transition region 34c. Line 35 of FIG. 3 signifies that the low $\lambda_0$ wavelength region 34a and the high $\lambda_0$ wavelength region 34b can be well controlled and at the same time widely separated. Where line 37 crosses curve 36 or curve 34 represents the average between the high and the low waveguide dispersions. For waveguide fibers having a bi-modal waveguide dispersion as shown in curve 34 of FIG. 3, only small changes in cut-off wavelength, or the proportional quantity, core radius, are required to produce the relatively large changes in zero dispersion wavelength as indicated in the example based on FIG. 2. Fibers that have dispersion characteristics represented by curve 34 also have the following advantage. In DM fibers that have alternate regions of large and small core diameter, the manufacturing process may result in slight deviations in diameter from design diameter. To illustrate this point, assume that the operating points for the fiber regions of different core diameter are $D_1$ and $D_2$ in FIG. 3. If $D_1$ and $D_2$ are located along the relatively flat regions of the bimodal curve, small fluctuations in core diameter or cutoff wavelength around $D_1$ and $D_2$ will not significantly alter the $\lambda_0$ value of the small core diameter regions nor the $\lambda_0$ value of the large core diameter regions.

Figure 4:
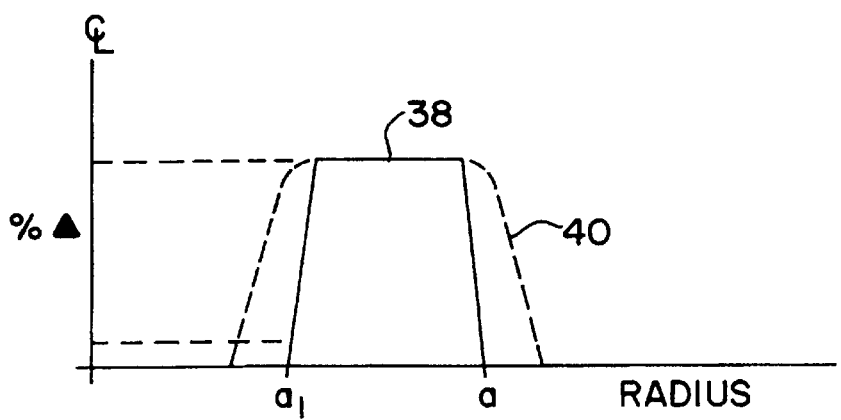
FIG. 4 is a chart of % index delta vs. radius for a simple design which approximates a bi-modal waveguide dispersion.

An ideal profile might be that represented by curve 38 of FIG. 4, the inner and outer radii of the core ring being represented by $a_1$ and a, respectively. However, certain manufacturing techniques may result in dopant diffusion causing the profile to deviate from the ideal profile to a profile such as that represented by dashed line curve 40. The inner radius of the core ring of profile 40 is smaller than $a_1$ and the outer radius is larger than a. This would make the waveguide dispersion curve less steep as shown in dashed line curve 36 of FIG. 3.

One may choose to use a profile which has a waveguide dispersion characteristic such as 36 in FIG. 3 to simplify the manufacturing process. This is clearly a weighing of cost compared to benefit. The particular telecommunication application will dictate whether a more complex profile is warranted. However, to best manage the total dispersion product, a waveguide fiber which has a sharp transition region separating waveguide dispersions of different levels is preferred. The required shifting between two disjoint wavelength ranges of dispersion zero may then be accomplished with smaller changes in radius, as low as 5% to 10% radius change, for profiles having the bi-modal waveguide dispersion. Thus the management of the sign change of total dispersion is facilitated. Also the distance in the waveguide that the signal travels, over which the total dispersion is less than about 0.5 ps/nm-km, is held to a minimum.

Figure 5A:
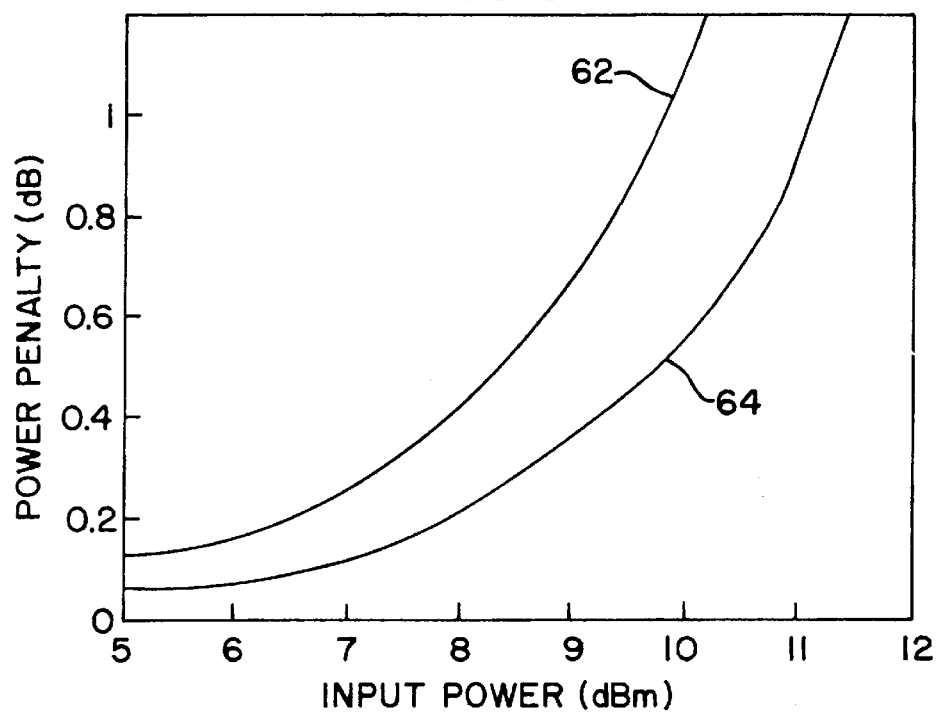
FIG. 5a is a chart illustrating the power penalty vs. input power for a system comprised of particular waveguide sub-lengths having a low total dispersion magnitude.
Figure 5B:
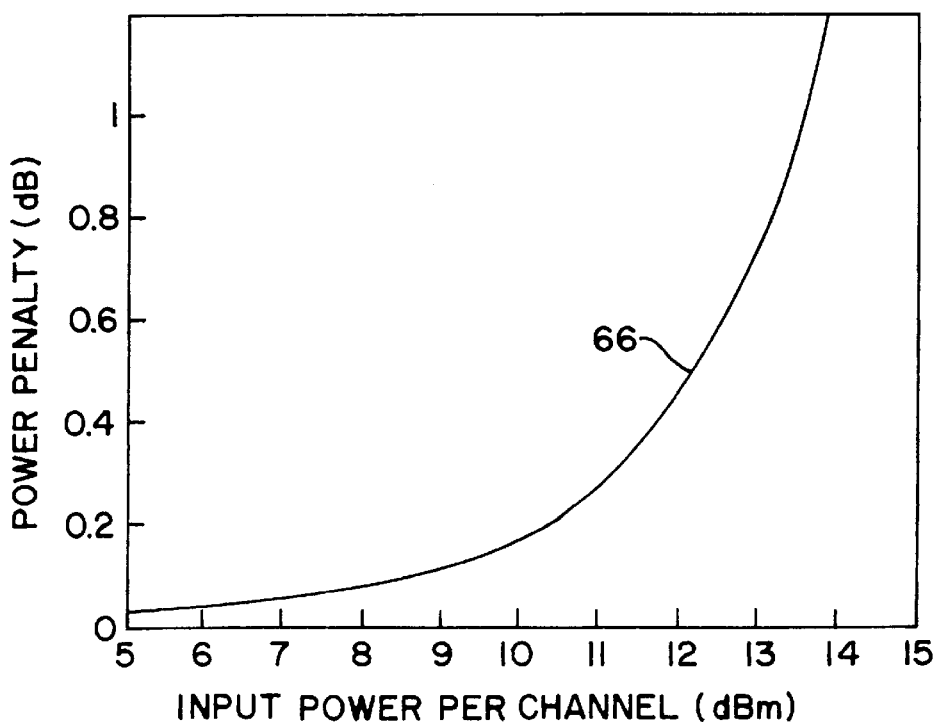
FIG. 5b is a chart illustrating the power penalty vs. input power for a system comprised of particular waveguide sub-lengths having a higher total dispersion magnitude.

The design of the DM fiber depends strongly on the details of the telecommunication system as can be seen in FIGS. 5a and 5b which show power penalty charted vs. input power for a 120 km link having 8 channels, wherein the frequency separation of channels is 200 GHz. In this case the power penalty is that due primarily to four wave mixing. Curve 62 in FIG. 5a rises steeply to a penalty near 1 dB for an input power of about 10 dBm. The penalty is about 0.6 dB for an input power of 10 dBm (curve 64). For both curves the magnitude of the total dispersion is about 0.5 ps/nm-km. However, for the steeper curve 62 the sub-length for total dispersion of a given sign is 10 km. The corresponding sub-length of the dispersion in curve 64 is 60 km. The extra penalty results from the additional transitions through zero dispersion for the shorter, 10 km sub-length case. An alternative statement is for the 10 km case, the phase separation of the signals, which is proportional to the oscillation sub-length, is not large enough to substantially prevent four wave mixing.

However, magnitude of the total dispersion also has an impact upon phase separation and thus upon power penalty. Curve 66 in FIG. 5b shows the power penalty for a system identical to that shown in FIG. 5a, except that the sub-length is shorter, about 1 km, but the total dispersion magnitude is 1.5 ps/nm-km. Causing the waveguide total dispersion to make wider positive to negative swings reduces power penalty significantly, from 0.6 dB to less than 0.2 dB. The penalty difference of about 0.4 dB/120 km is large enough to be the difference between a functional and non-functional link, especially for long unregenerated links of 500 km or more.

Figure 6:
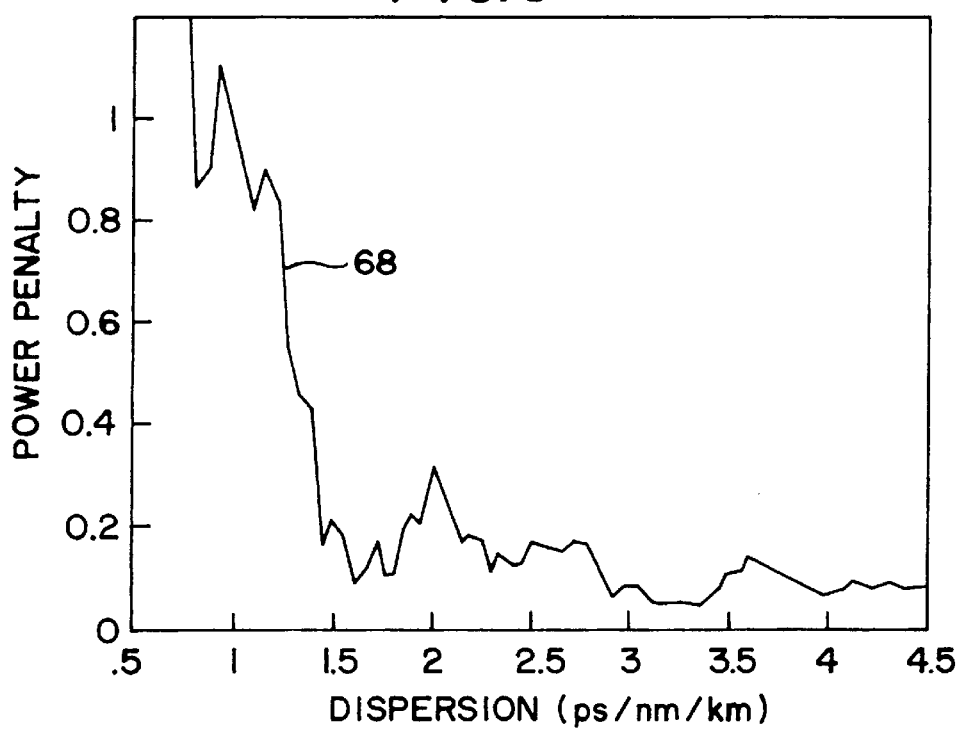
FIG. 6 is a chart of total dispersion vs. power penalty.

FIG. 6 is interpreted in essentially the same manner as FIG. 5a an 5b. Curve 68 shows power penalty charted vs. total dispersion magnitude. The sub-length of the waveguide is chosen as about 1 km because the length of the shortest cables in general use is about 2 km. Again there are 8 channels having a frequency separation of 200 GHz, a total length of 120 km, and the input power is 10 dBm. Again the power penalty rises steeply when total dispersion magnitude falls below about 1.5 ps/nm-km.

Figure 7:
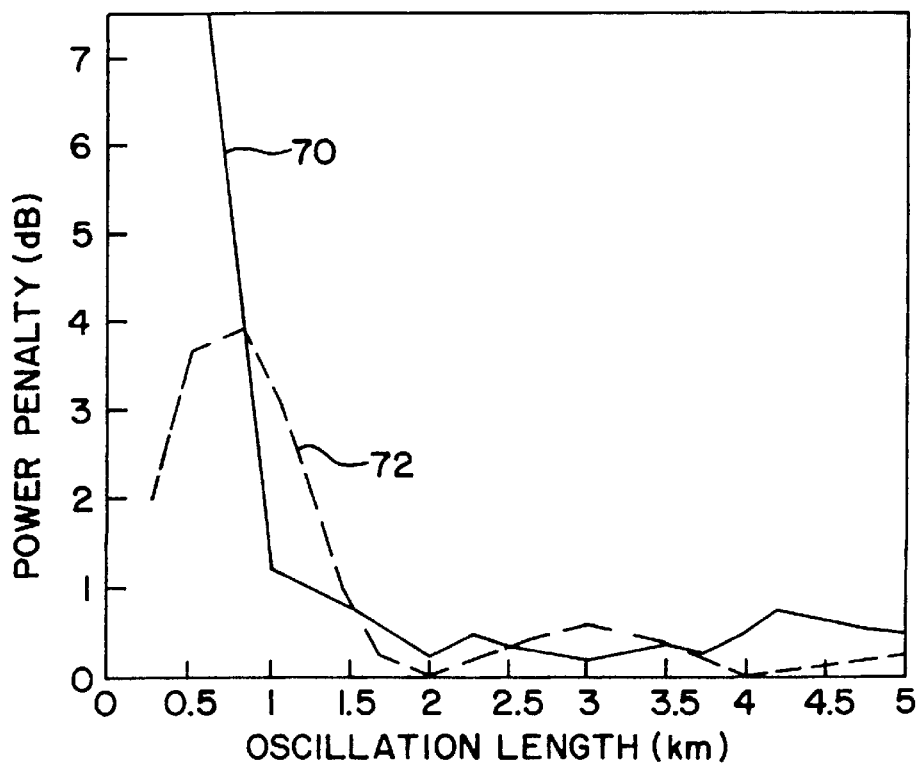
FIG. 7 is a chart of dispersion variation period length vs. power penalty.

System design is shown from another viewpoint in FIG. 7. In this case, the dispersion magnitude is fixed at 1.5 ps/nm-km. Curve 70 represents power penalty vs. sub-length magnitude for a system having 8 channels with 200 GHz frequency separation and 10 dBm input power. The length is chosen to be 60 dispersion sub-lengths and the sub-length is allowed to vary. Lower power penalties result when the sub-length is above 2 km. But with the relatively large total dispersion magnitude, little is gained by lengthening the sub-length beyond 2 km. Note the generally lower four wave mixing penalty paid when the number of channels used is reduced to 4 as shown by curve 72. This latter phenomenon is a direct result of the dependence of phase separation on the fiber characteristics noted above and in the "Definitions" section.

Another design consideration is the sharpness of the transition length over which the total dispersion changes sign. Here also, the signal phase separation is affected by the transition length. Thus, a shallow transition would cause the signal to travel a waveguide region of near zero total dispersion, and this adversely impacts power penalty caused by four wave mixing.

Figure 8:
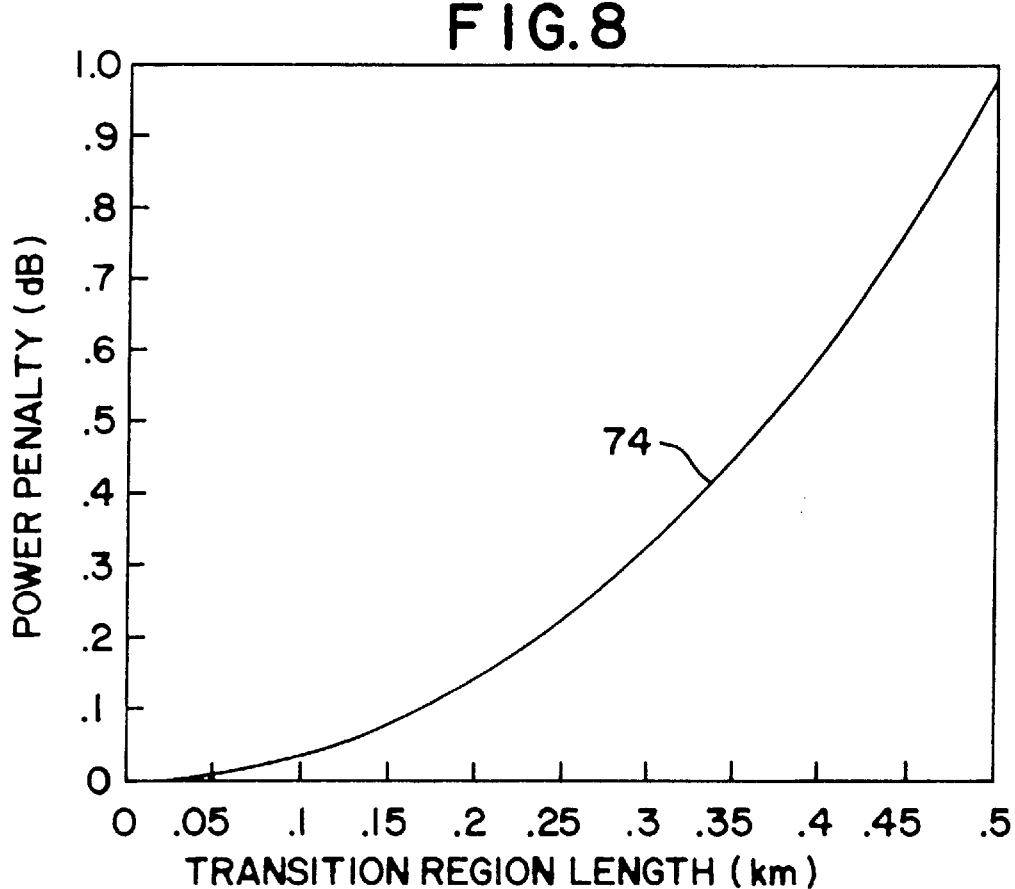
FIG. 8 is a chart of transition region length vs. power penalty.

Example Based on FIG. 8

In this case, the input power is again 10 dBm. Four channels are used having a frequency separation of 200 GHz. The magnitude of total dispersion is 1.5 ps/nm-km and the oscillation length of the total dispersion is taken to be 2 km. The chart of power penalty vs. transition length, shown as curve 74 in FIG. 8, shows that shorter transition lengths are preferred. Also, the number of transitions should be a minimum, in the framework of other design considerations and cost benefit studies. Because some systems may allow a power penalty of about 1 dB, a maximum tolerable transition length is about 500 meters, as shown in FIG. 8.

Fiber Fabrication Techniques

The period of the optical fiber can be chosen to be a few tens of meters to hundreds of meters so that over any reasonable link length, the average dispersion is quite small over the operating wavelength window.

If the transition regions between the regions of higher and lower dispersion are too long, the dispersion in the central portions of the transition regions will be near zero for some finite length of fiber. This will result in some power penalty due to four wave mixing. The longer the transition regions are, the higher the power penalty. The transition regions should therefore be sufficiently sharp that the fiber power penalty does not cause the total system power penalty to exceed the allocated power penalty budget. Moreover, the process should not be one that itself induces an excess loss that is unrelated to four wave mixing. Also, the process should be simple and be sufficiently flexible that it can be implemented with a variety of fiber designs and materials.

The disclosed techniques include: (a) modification of core refractive index during draw, (b) fabrication of a draw preform having a variable diameter core and a constant diameter cladding or a substantially constant diameter cladding, and (c) fabrication of a draw preform having a constant diameter core and a variable diameter cladding. Moreover, combinations of these techniques could be employed.

(a) Modification of Core Refractive Index During Draw

Figure 9:
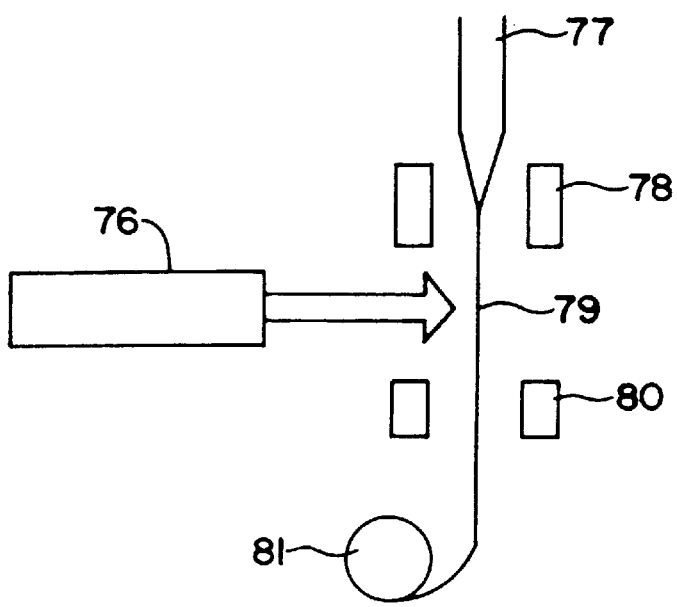
FIG. 9 is a schematic of an apparatus for drawing a fiber and irradiating the fiber before applying a protective coating.

A schematic of waveguide fiber draw apparatus is shown in FIG. 9. As is well known in the art, draw blank 77 is heated in furnace 78, and drawn into waveguide fiber 79. Waveguide 79 is given a protective coating at coating apparatus 80 and wound onto a take up reel 81. The novel addition to this apparatus is a high power, well focused source of ultraviolet radiation 76, directed at the waveguide fiber after drawing but before coating. Ultraviolet light is known to have the effect of raising refractive index in a doped region of the waveguide. Thus ultraviolet light will act to increase the refractive index of the core region. The ultraviolet source is turned off and on periodically to induce variation in refractive index along the waveguide fiber length. The variations must be large enough to produce variation in total dispersion sufficient to reduce power penalty due to four wave mixing. It has been found that at least one pulse of 10 to 20 ns duration having an energy flux of about 100 mJ/cm$^2$ is sufficient to produce some beneficial effect. An excimer laser, operating at about 248 nm, is an excellent source of high intensity, well focused ultraviolet radiation.

(b) Modify Core Preform Core Diameter; Then Overclad

A core preform is a preform that, after being provided with cladding glass, can be drawn into an optical fiber. An economical technique for forming high quality core preforms includes the steps of (a) forming a porous glass preform by a glass particle deposition process, (b) consolidating the porous preform to form a consolidated preform, (c) closing the axial aperture in the consolidated preform if such an aperture exists, and (d) optionally stretching the preform before applying the cladding (the aperture closing step is advantageously performed during this stretching step). See U.S. Pat. No. 4,486,212, which is incorporated herein by reference. As disclosed in U.S. Pat. No. 4,486,212, the core preform may comprise a central region of core glass surrounded by a thin layer of cladding glass. Alternatively, the core preform may consist entirely of core glass, as shown in FIG. 10a.

Figure 10A:
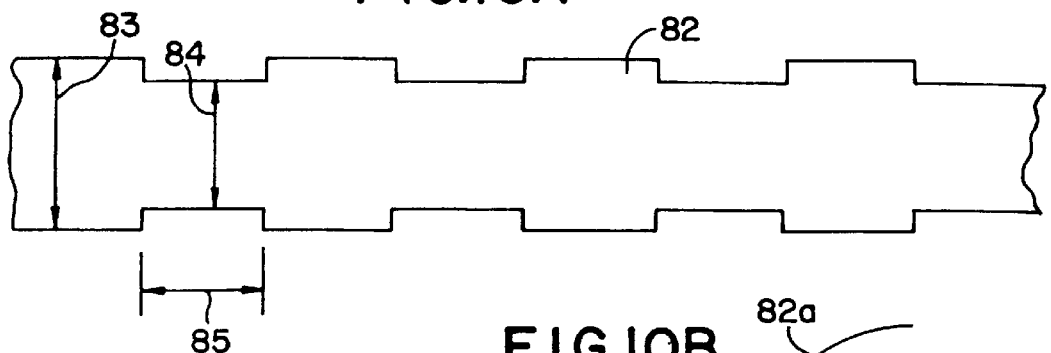
FIG. 10a illustrates a longitudinal section of a core preform having length sections of reduced diameter.

FIG. 10a shows a glass core preform 82 of diameter 83. At intervals along the core preform length, the diameter is reduced as shown by diameter 84. The length of the reduced area is shown by line 85. Diameter 84 may be reduced relative to diameter 83 by 5% to 25% to yield the desired variation in core diameter. The length 85 is adjusted to yield in the resultant optical fiber the desired sub-length of reduced core diameter. The diameter of the core preform may be reduced by any of several methods known to those skilled in the art, including grinding, etching, laser ablation and heating and stretching. A polishing step may be used after grinding or etching to insure a uniform and clean interface between core preform and cladding layer.

If reduced diameter regions are formed in the core preform by machining or etching into the core, then it is preferred that the core have a step index profile. That portion of the core that is removed will have substantially the same refractive index as the remaining portion.

Core preform 82 of FIG. 10a is rotated (arrow 82a) and translated along its longitudinal axis with respect to burner 86 which directs a stream 87 of cladding glass particles thereon to build up a layer 88 of cladding glass particles. The resultant coated core preform is inserted into a consolidation furnace where coating 88 is dried and sintered to form a draw blank having a dense glass cladding layer. If the length 85 of the core preform slots is at least a few millimeters, the cladding particles 87 will fill the reduced diameter regions. The outer surface of the draw preform will therefore be slightly nonuniform. The diameter variations in the draw blank will tend to be small because the amount of the core diameter reduction is small.

Figure 10B:
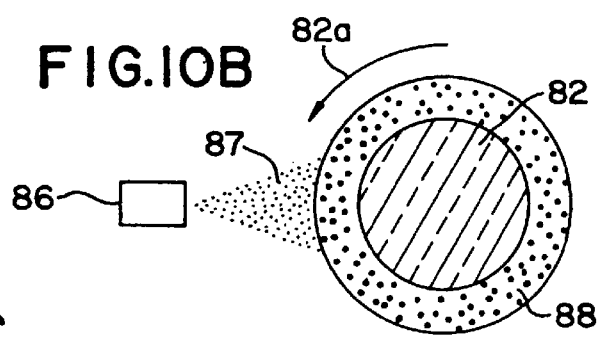
FIG. 10b illustrates the application of cladding glass particles to a core preform.
Figure 10C:
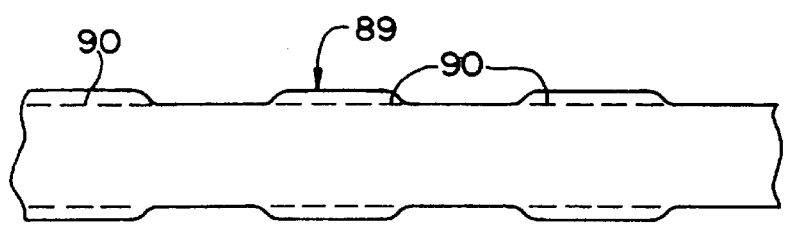
FIG. 10c shows undulations that can exist in the surface of the draw blank as a result of diameter variations in the core preform.
Figure 10D:
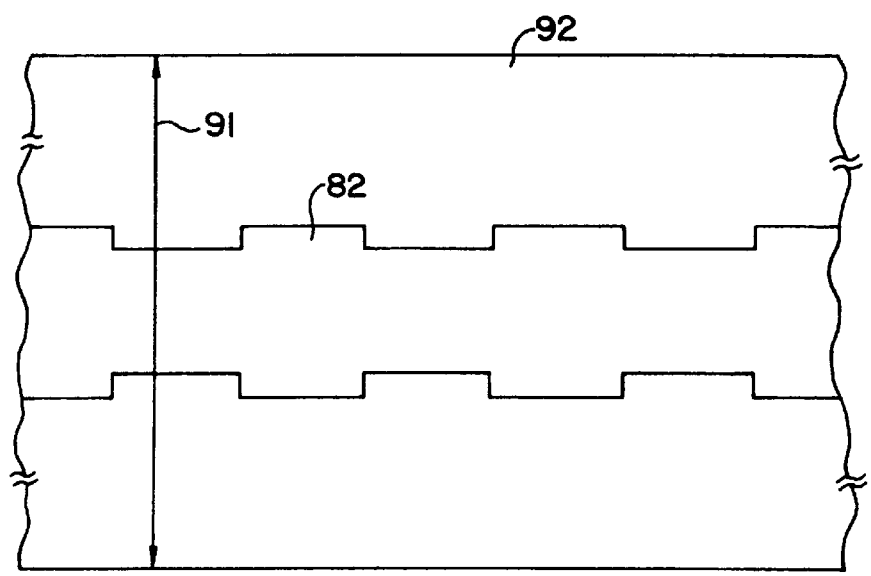
FIG. 10d shows a longitudinal section of the core preform of FIG. 10a with an overclad layer having a cylindrical outer surface.

The overclad soot 88 of the coated core preform or the consolidated glass draw preform may be smoothed by ordinary techniques to insure a cylindrical shape for the draw preform. Since the core preform is fragile, the diameter modification step is preferably performed on the consolidated preform. FIG. 10c shows a consolidated preform 89 having diameter variations. The thickness of these variations is exagerated for the sake of clarity. Preform 89 can be rotated about its central longitudinal axis, and the regions of larger radius can be removed by machining, etching, or the like, so that surface regions 90 have the same diameter as the remainder of the preform. As shown in FIG. 10d, the resultant draw preform has a substantially uniform outer diameter 91. The modified core preform 82 is shown encased in cladding material 92.

Also, the overcladding method may readily be modified by one skilled in the art to insure a uniform diameter draw preform. For example, the rate of traverse of burner 86 with respect to core preform 82 can be varied in accordance with the particular sublength of core preform that is being built up by stream 87. The burner traverse is slower as it deposits particles on the narrow diameter core regions than when it deposits on the large diameter core regions. The buildup of cladding glass particles over the narrow and wide core preform regions can be such that the diameter of the of the draw blank produced by consolidating the particles is essentially constant.

When the draw preform of FIG. 10d is drawn to a uniform diameter waveguide fiber, the reduced diameter core preform portions become reduced diameter core portions of the fiber. If a draw blank has regions of larger diameter, such as those shown in FIG. 10c, the core of the fiber sublength drawn from that larger diameter region will have a diameter that is smaller than desired. If the larger diameter regions of the draw blank are not removed as described above, the diminishing of the fiber core diameter in those regions of the resultant fiber will have to be considered when designing the DM fiber.

In the embodiment shown in FIGS. 11a and 12, a core preform 93 of any appropriate fiber core design is mounted in a lathe 96, 98 (horizontal or vertical) or other appropriate equipment and heated with a very narrow flame 102 from burner 100. The heat from the burner is preferably axially localized to no more than a few millimeters along the core preform. The temperature and heat capacity of the flame must be sufficient to locally soften the core preform glass. As shown in FIG. 12, core preform 93 includes a core region 95 surrounded by a layer 94 of cladding glass. If the fiber is a silica based fiber that is to operate in the 1500–1600 nm window, core preform 93 would be one that is suitable for forming a dispersion shifted fiber having zero dispersion in that range. As the glass reaches its softening point, the core preform is pulled to reduce the diameter in the heated region. This produces the narrow diameter regions 108. The pulling step is normally performed while the flame is directed at the region being pulled. If a horizontal lathe is used, rotation of the core preform would help prevent any distortion of the core preform during the pulling operation. The heating and pulling steps are performed at the required intervals along the length of the core preform. The stretching is preferably done such that the lengths $L_1$ and $L_2$ of the core preform at the two diameters are approximately equal. The burner is then moved at a rapid rate to the next region that is to be softened and stretched.

FIG. 11a shows one type of burner design that provides a very localized heating condition that results in sharp transitions between the core preform regions of different diameters. The face of burner 100 has a circular array of combustion gas orifices that provides a flame 102, and a circular array of outer shield gas orifices that provide a cylindrical stream of cooling gas. Outer shield stream 103 confines and focuses flame 102 and at the same time provides convection cooling on the core preform outside of the localized heating zone. The flame should have as uniform a temperature as possible across the hot zone with as sharp a temperature gradient as possible at the edge of the hot zone. This will result in a relatively short transition length $L_T$. Temperature profile 106 of FIG. 11b represents a preferred profile across region A—A of flame 102.

Other types of burners or burner combinations can also be used for this purpose. For example, a focusing burner such as that disclosed in U.S. Pat. No. 3,565,345 contains slanted nozzle openings to direct streams of combustable gas to a common point. A ring burner capable of providing a flame confined by a focusing outer shield gas stream could surround the core preform and simultaneously heat an entire circumferential region of the preform. A ribbon burner having one or more linear arrays of combustion gas orifices and optionally containing linear arrays of shield gas orifices could be employed, the array of combustion gas orifices being disposed perpendicular to the longitudinal axis of the core preform.

Example Based on FIGS. 11a and 12

A core preform 93 having a cladding diameter of about 7 mm and a core diameter of about 5 mm is reduced in diameter to about 6.5 mm at intervals along the core preform length. The length $L_1$ (FIG. 12) is chosen to be 2 mm. The core preform is overclad as shown in FIG. 10b and consolidated to form a draw preform having a final diameter of about 50 mm.

When the draw preform is drawn into a waveguide having a uniform outer diameter of about 125 μm, the length $L_1$ becomes about 320 meters, assuming that the mass of the 2 mm segment is conserved and that the core radius variation, expressed as % difference, is about 14%. This example assumes that the refractive index profile of the core is of the type disclosed in U.S. Pat. No. 4,715,679 and U.S. patent applications Ser. Nos. 08/323,795, 08/287,262, and 08/378, 780, whereby a core diameter of about 16 μm will result in single-mode propagation.

If the draw preform diameter is about 100 mm, under the same core preform and draw conditions, length 85 becomes 1280 meters and the core radius variation is unchanged.

FIG. 13 shows that additional localization of the heat can be achieved by directing external focused cooling jets 122 of air, nitrogen, helium or the like from sources 120 onto that portion of core preform 116 adjacent the region that is to be heated by flame 118. By "external cooling jets" is meant jets that originate from a source other than the burner face. These jets could flow from orifices formed in a plate at the end of the coolant gas delivery tube. Sources 120 could be positioned 180° with respect to the burner, as shown, or they could be positioned 90° or any other suitable orientation with respect to the burner that ensures that the jets do not interfere with the heating of the core preform.

Figure 14:
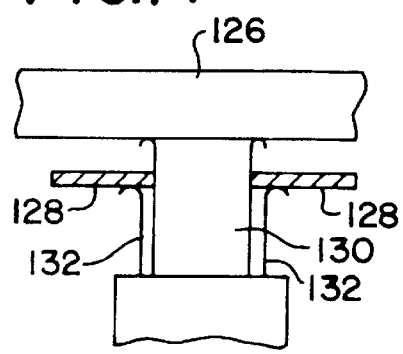
FIG. 14 illustrates a device for confining the burner flame to a narrow section of the core preform.
Figure 15:
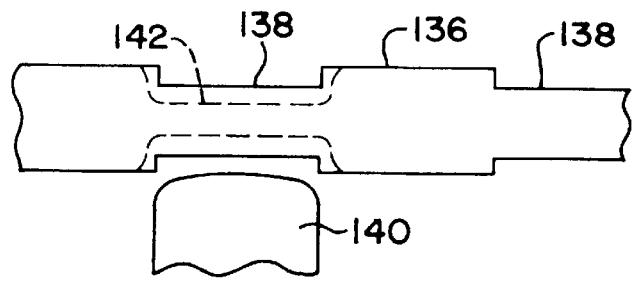
FIG. 15 shows the heating of a slotted region of a core preform.

Another technique for sharpening the temperature profile of the flame is illustrated in FIG. 14. Shields or baffles 128 deflect portions 132 of the flame and allow only central region 130 of the flame to heat core preform 126. The baffles can consist of cooled plates of metal, ceramic or carbon. Periodic slots 138 are initially formed in core preform 136 of FIG. 15 by etching, grinding, laser ablation or the like to reduce the mass of the core preform within the slots. The flame heats up these slotted regions more rapidly and preferentially as compared to the adjacent large diameter regions. When a slotted region is heated and stretched to form narrow diameter region 142, it therefore forms a relatively sharp transition region.

Figure 16:
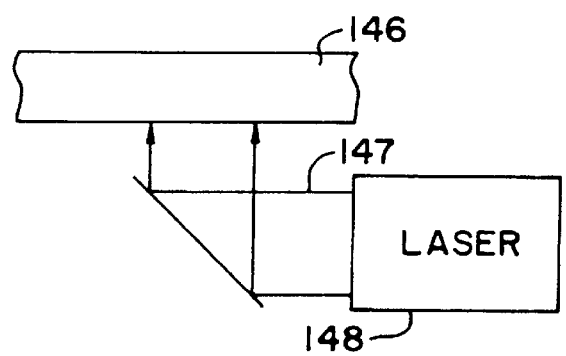
FIG. 16 shows the heating of a core preform with a laser beam.

FIG. 16 illustrates the use of a laser 148, such as a $CO_2$ laser, of sufficient power to provide a beam 147 for locally heating and softening core preform 146 so that it can be stretched as described above.

Figure 17:
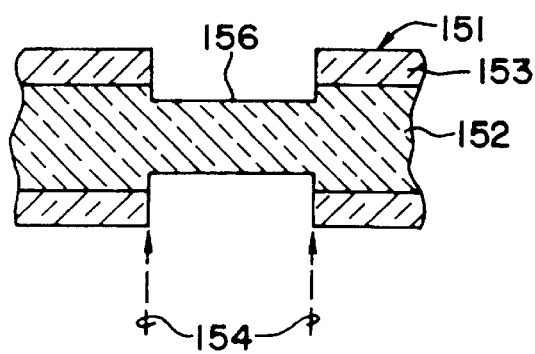
FIG. 17 shows that a laser beam can be used for machining slots in a core preform.

The power and/or duration of the laser beam 154 (FIG. 17) can be sufficient to ablate material from a core preform 151 to form narrow diameter regions 156. Examples of lasers suitable for this purpose are $CO_2$ and Excimer lasers. Since the regions formed by laser ablation are relatively smooth and since the laser beam can cut through the cladding portion 153 of the core preform and into the core region 152, no stretching step is required to form the different diameter core regions.

Figure 18:
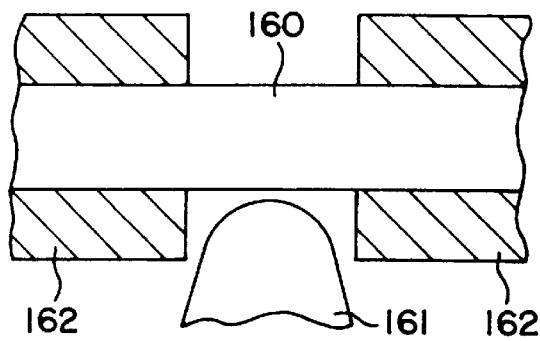
FIG. 18 illustrates the use of heat conducting sleeves.

FIG. 18 illustrates the use of heat conducting sleeves 162, which are optionally provided with means for conducting a coolant medium on or within the surface thereof. Sleeves 162 localize the region of core preform 160 that is sufficiently heated to permit stretching. The core preform is therefore provided with a relatively sharp diameter transition when it is stretched.

In the embodiment of FIG. 19, the core preform 165 is inserted into a flame working lathe as described above. Spaced regions are heated by flame 167. Instead of pulling the core preform, opposite sides of the heated region are traversed toward the heated region, thereby increasing the diameter in the heated region with sharp bulges 166.

A multi-diameter core preform can be formed in a draw furnace (FIG. 20) which includes resistance heater 171. Preform feed apparatus 175 and motor-driven tractors 176 advance into the hot zone generated by heater 171 that portion of core preform 170 that is to be stretched. After the glass is soft enough to be stretched, tractors 174 and/or the preform feed apparatus 175 pull the engaged portion of the core preform away from the heated region to stretch it, thereby forming small diameter region 172. Means 175 and 176 then traverse the core preform through the hot zone generated by heater 171 until the next region to be stretched is positioned in it. This stretching of the core preform is repeated at spaced regions along its length such that unstretched large diameter regions 173 are positioned between the small diameter regions 172. Various techniques for drawing multi diameter rods are disclosed in U.S. Pat. No. 4,704,151, which is incorporated herein by reference. For example, tractors 176 could be spring loaded, as indicated by arrows 177 to ensure that they are in constant contact with the multi-diameter core preform 178.

It is noted that the heated regions of the core preform of FIG. 20 could be made to enlarge rather than reduce in diameter by merely causing the redraw tractors 174 and/or the delivery apparatus 175 advance the preform toward the heated region.

Referring to FIG. 21, wherein furnace elements similar to those of FIG. 20 are indicated by the same reference numerals, a multidiameter core preform 182 is drawn from the consolidated preform 181 in a draw furnace which includes feed apparatus 175, heater 171 and tractors 176. Consolidated core preform 181 is of the type formed by the method of the aforementioned U.S. Pat. No. 4,486,212, whereby a longitudinal aperture extends therethrough. Preform 181 is fed to the hot zone at a constant rate by feed means 175. The preform aperture is evacuated by affixing to the end of the preform a vacuum fixture 184 that is connected to a vacuum source V. The tractors pull at a first draw rate to form the large diameter regions 185 and at a higher rate to form the narrow diameter regions 186. As the diameter of preform 181 decreases to form either the large or the small diameter regions of core preform 182, the evacuated aperture collapses. Some of the above mentioned approaches can be used in conjunction with others of the above mentioned approaches to improve the control on the process and to decrease the length $L_T$ of the diameter transition regions.

After the core preform is stretched or expanded in accordance with any of the methods described above, it can be overclad using normal procedures. If the core preform diameter and overclad deposition weight are properly adjusted, a substantially cylindrical draw blank can be formed during the consolidation process.

Example Based on Technique of FIGS. 11a and 12

A preform was formed by a glass particle deposition process of the type disclosed in U.S. Pat. No. 4,486,212. The preform was stretched to form a core preform having an outside diameter (OD) of 7 mm and a core diameter of 4.55 mm. The core refractive index profile was that of a standard dispersion shifted fiber and was similar to that disclosed in U.S. patent application Ser. No. 08/323,795. The profile included a central region of $GeO_2$-doped $SiO_2$ (where the $GeO_2$ content decreased substantially linearly with radius) surrounded by a layer of substantially pure $SiO_2$ which was in turn surrounded by a layer of $GeO_2$ doped $SiO_2$. The peak $GeO_2$ concentration (at the center of the core) was about 20 wt. %. The cladding was formed of pure silica. The diameter of sections of the core preform was reduced by the technique disclosed in connection with FIG. 11a. The heat source was a small burner known as Type 3A blowpipe torch having a 1 mm nozzle; it is made by Veriflo Corporation of Richmond, Calif. The fuel was hydrogen and oxygen. A length of the core preform was not stretched so that a constant core diameter reference fiber could be drawn. The resultant core preform was overclad with silica particles. The coating of cladding glass particles was consolidated, and separate fibers were drawn from the reference section and from the section having diameter variations.

Figure 22:
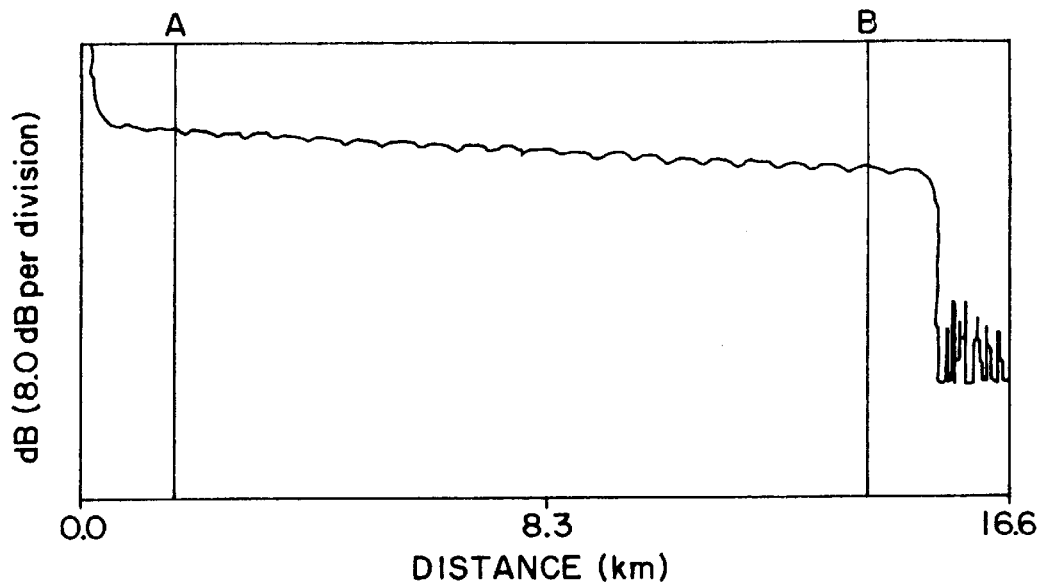
FIG. 22 is a graph of an optical time division reflectometry signal from a Dispersion managed fiber showing periodic dips in the signal that signify diameter fluctuations in the fiber core.
Figure 23A:
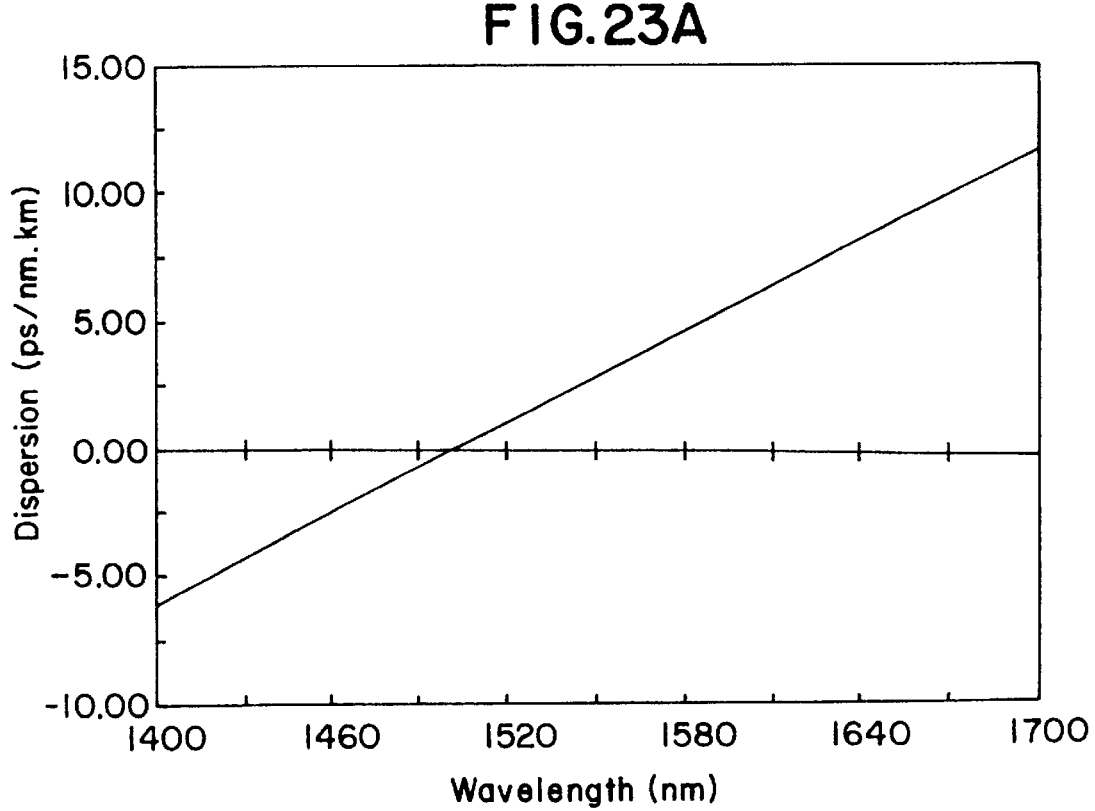
FIGS. 23a–23c are plots of dispersion vs. wavelength for optical fibers having different core diameters.

The optical time division reflectometry (OTDR) signal from the DM fiber (FIG. 22) shows periodic dips in the signal, thereby signifying diameter fluctuations. The trace shows uniform sections with reasonably sharp transitions. The length of a period is about 600 meters. The fiber drawn from the reference section of the draw blank had an OD of 125 µm and a length of 2.0 km. As shown in FIG. 23(a) the reference fiber exhibited zero dispersion at 1500 nm.

Figure 23B:
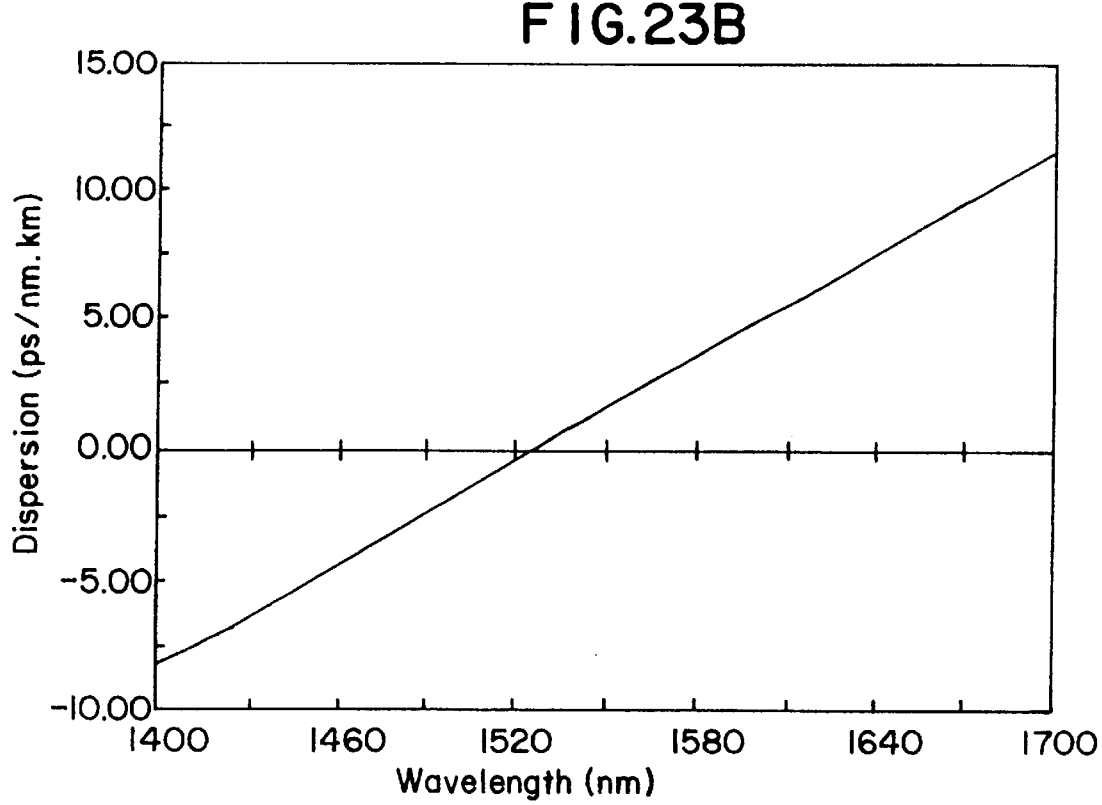
Figure 23C:
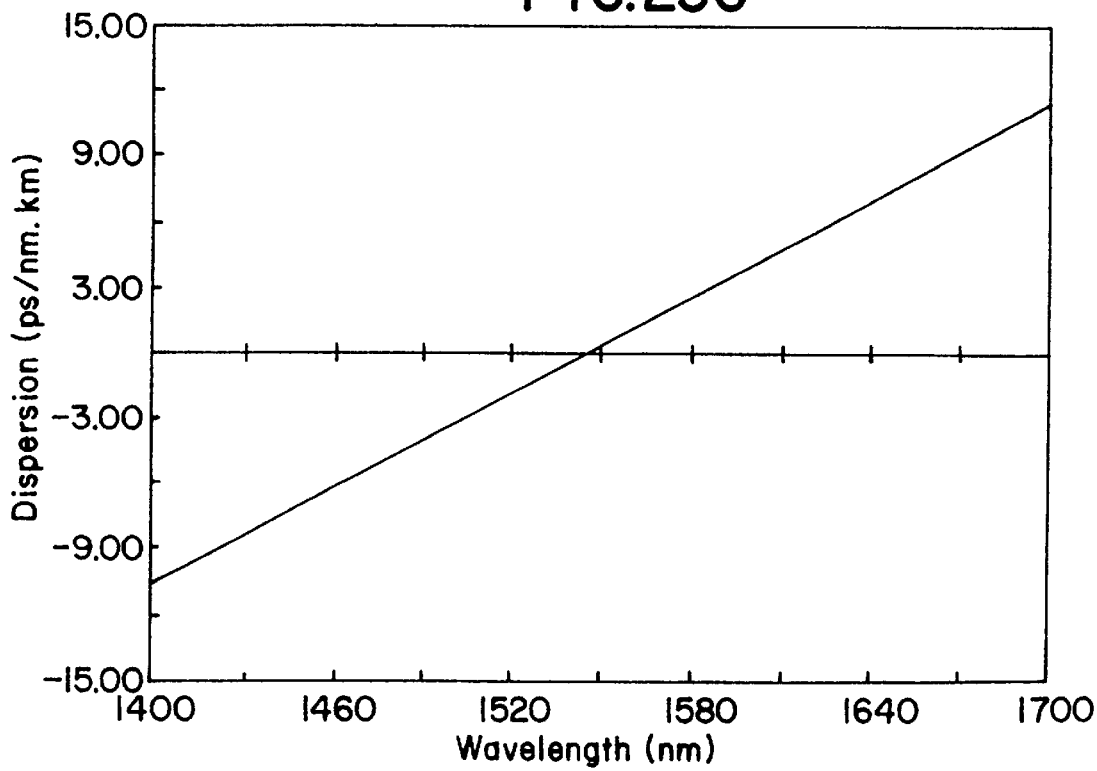

A DM fiber drawn from the flame-stretched portion of the draw blank to an OD of 130 µm and a length of 3.6 km has a zero dispersion wavelength of 1525 nm as shown in FIG. 23(b). A DM fiber drawn from the flame-stretched portion of the draw blank to an OD of 120 µm and a length of 4.0 km has a zero dispersion wavelength of 1544.5 nm as shown in FIG. 23(c). Thus, a DM fiber drawn from the flame-stretched portion of the draw blank to an OD of 125 µm would exhibit a zero dispersion wavelength of 1535 nm. This indicates an average shift in zero dispersion wavelength of about 35 nm (for a 125 µm fiber) compared to the reference fiber. It can therefore be concluded that the dispersion is fluctuating between 1500 nm and about 1570 nm to give an average of 1535 nm. Similar variations in cutoff wavelengths have also been observed. These results illustrate that DM fibers having high and low values of $\lambda_0$ in the 1500 nm to 1600 nm range have been fabricated.

Back reflection data indicates that even with the diameter variations in the fiber, the back reflection is only slightly higher than that for a fiber having a constant diameter core.

(c) Form Draw Blank Having Variable Cladding Diameter

Figure 24A:
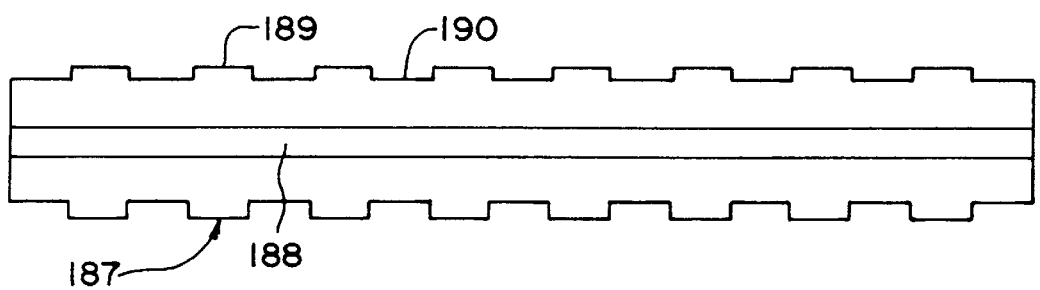
FIG. 24a is a longitudinal section of a draw blank having length sections of reduced diameter.
Figure 24B:
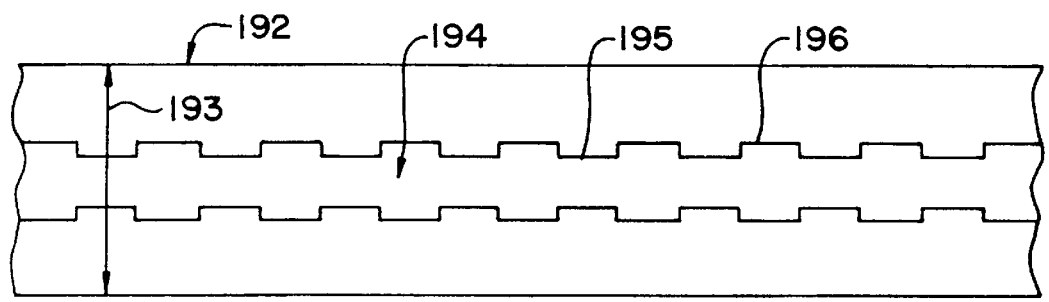

An alternative method for introducing the core radius variation is illustrated in FIGS. 24a and 24b]. In this case the draw blank 187 is reduced in diameter at intervals along its length by grinding, laser machining, etching or the like. The resultant draw blank has preselected sublengths 189 having relatively large diameter and preselected smaller diameter sublengths 190. Note that the diameter of core region 188 is uniform. The subsequent drawing of draw blank 187 to a fiber 192 having a uniform outside diameter 193 transfers the diameter variation from the outer surface of the draw preform to the fiber core 194. As described in conjunction with FIGS. 10a and 10b, knowing the lengths and diameters of the core and cladding of the large and small diameter sections of the draw blank will permit the corresponding lengths and diameters of the resultant optical fiber to be calculated by asserting conservation of mass of the appropriate draw blank segment. As shown in FIG. 24b, fiber 192 includes sub-lengths, $l_i$, of reduced core diameter corresponding to the draw preform sub-lengths of larger diameter, the remainder of fiber 192 comprising sub-lengths, $l_j$ of larger core diameter. The reduced core diameter sub-lengths are made up of segments $dl_i$, having an associated total dispersion product $dl_i*D_i$, and the larger diameter sub-lengths are made up of segments $dl_j$, having an associated total dispersion product $dl_j*D_j$. The algebraic sum of products $dl_i*D_i$ and $dl_j*D_j$ is equal to a pre-selected value, over a pre-determined wavelength range R.

Figure 25:
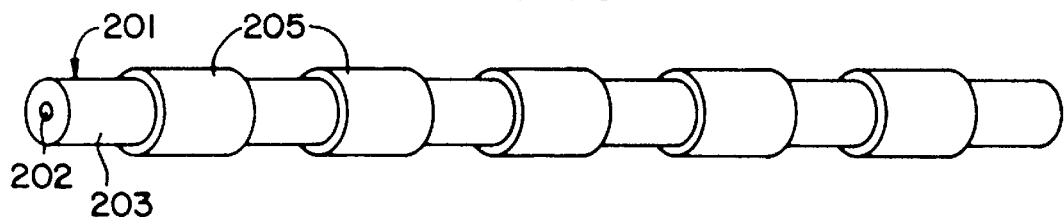
FIG. 25 shows a method of adding sleeves to a draw blank to form length sections of different diameter.

In the embodiment shown in FIG. 25, a draw blank 201 includes a constant diameter core 202 surrounded by a constant diameter cladding layer 203. The core diameter is sufficient to provide a fiber section having a given zero dispersion wavelength. Sleeves 205 of cladding glass are fused to draw blank 201 at periodic positions along its length to form a modified draw blank from which a DM fiber can be drawn. As shown in FIG. 24(b), the resultant optical fiber will have a constant outside diameter, and the core diameter will vary in accordance with the periodicity of sleeves 203. The fiber drawn from the region of the blank surrounded by a sleeve will have a smaller diameter core than the regions of the blank having no sleeve. The dispersion of the narrow diameter portion of the DM fiber will exhibit a zero dispersion wavelength different from the given zero dispersion wavelength.

Figure 26:
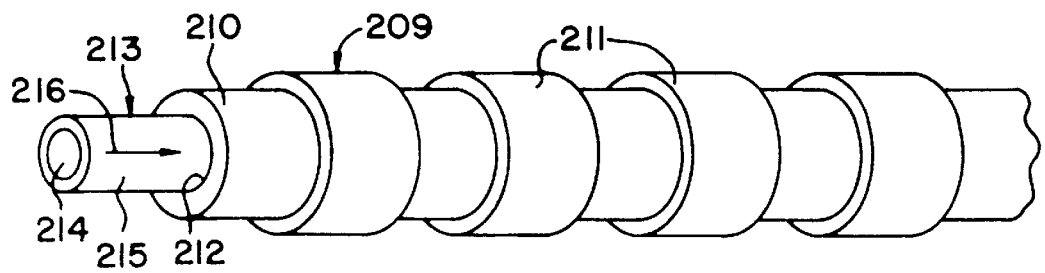
FIG. 26 shows a method of inserting a core preform into a sleeved cladding tube to form a draw blank having length sections of different diameter.

In accordance with the method of FIG. 26 there is initially provided a periodically-shaped cladding glass sleeve 209 having small diameter portions 210 and large diameter portions 211 and a bore 212 extending along the central longitudinal axis. Sleeve 209 can be formed by techniques such as machining a cylindrically-shaped glass tube or by fusing glass sleeves onto a cylindrically shaped tube. A core preform 213 preferably including a core region 214 and a thin cladding layer 215 is formed by any suitable technique. As indicated by arrow 216, core preform 213 is inserted into bore 212. As described above, the resultant draw blank is drawn into an optical fiber having a constant outside diameter, and a core diameter that varies in accordance with the periodicity of sleeves 211.

The methods of FIGS. 25 and 26 separate the core preform fabrication process from the process of shaping that part of the draw blank that introduces the periodic aspect of the draw blank. The process of making dispersion shifted fiber of the type disclosed in U.S. Pat. No. 4,715,679 and U.S. patent applications Ser. Nos. 081323,795, 08/287,262, and 08/378,780 includes a tuning step directed by measurements on the core preform. Tapering or etching the core preform could complicate that tuning process. By using independently prepared sleeves, the process of making the draw blank will have minimal impact on the core preform tuning process.

The methods of FIGS. 25 and 26 should result in very sharp transitions between the two regions of different dispersion; as stated above, this is a desirable characteristic of DM fiber.

Figure 27:
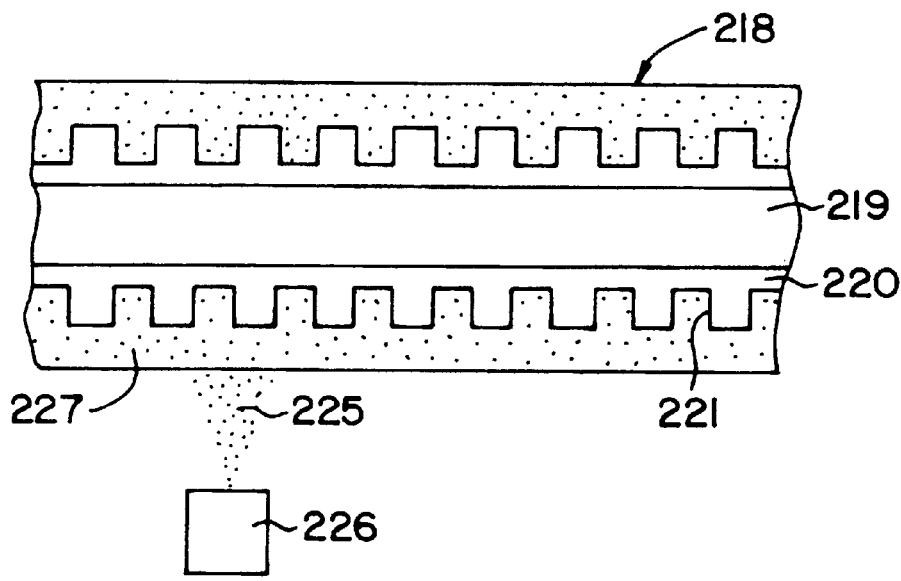
FIGS. 27–29 illustrate another method for forming a variable diameter draw blank from which a variable core diameter dispersion managed fiber can be drawn.
Figure 28:
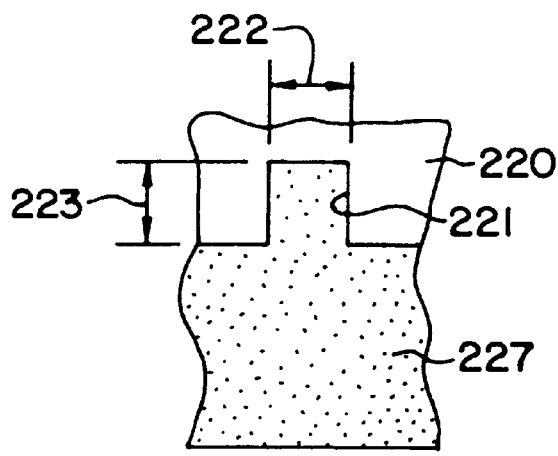
Figure 29:
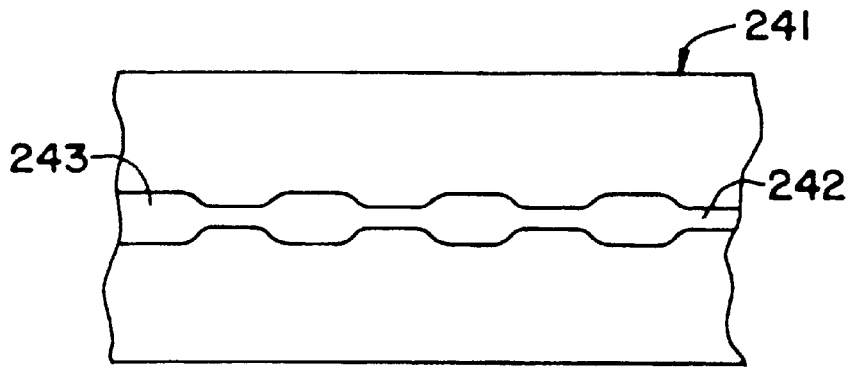

FIGS. 27–29 show a core preform 218 having a core region 219 and a cladding 220. Annular slots 221 are formed in the surface of preform 218 by grinding, laser machining or the like. In accordance with this method, slots 221 should not extend into the core region. Burner 226 directs a stream 225 of cladding glass particles onto preform 218 to build up a porous glass layer 227.

An enlarged view of a single slot is shown in FIG. 28. The maximum length 222 of 221 is about 1 to 2 mm. The flow conditions of stream 225 impinging upon a surface having such a short annular slot results in a low density glass particle buildup within the slot. The density of the dots in FIG. 28 represents the density of the deposited glass particles. As the depth 223 of the slot increases, the density of the buildup decreases. The density of buildup is also affected by the composition of the glass particles. Softer glass particles result in the formation of a denser buildup. Thus, particles of pure silica, which is a very high viscosity glass, form a buildup of very low density in slots 221. Indeed, even voids can form within slots 221 depending on particle deposition conditions. After layer 227 has been built up to a thickness sufficient to form the cladding of a single-mode optical fiber, the resultant preform is consolidated (dried and sintered). This step is conventionally carried out in an atmosphere of helium and a small percentage of chlorine to dehydrate the glass particles. The preform could be soaked in pure helium prior to the sintering process to degas any voids during the later high temperature sintering step. The sintered draw blank has sublengths of reduced diameter where the glass particles had been deposited over the slots. When the draw blank is drawn into a single-mode fiber 241, the core includes smaller diameter regions 242 and larger diameter regions 243 which correspond to those regions of the draw blank where the slots had been.

Figure 30B:
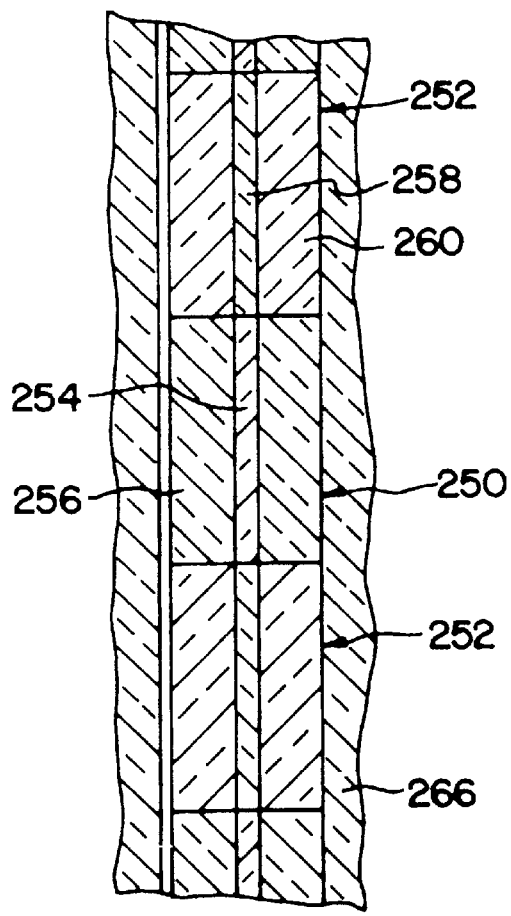
FIGS. 30A and 30B illustrate another method in accordance with the present invention.
Figure 30A:
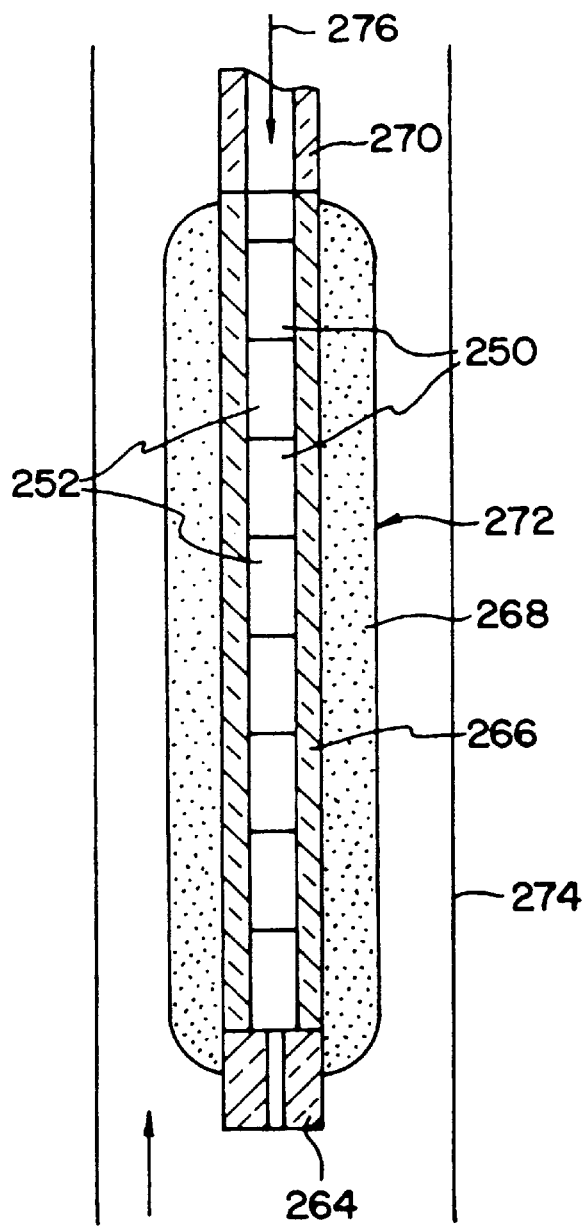

A method that produces very short transition regions is illustrated in FIGS. 30a and 30b. Two different core preforms are made by a method such as that disclosed in U.S. Pat. No. 4,486,212. Both core preforms have core refractive index profiles of the type that yield dispersion shifted fibers. The first core preform is such that if it were provided with cladding and drawn into a single-mode fiber having a 125 $\mu$m OD, it would exhibit zero dispersion at 1520 nm. The second preform is such that if it were similarly formed into a 125 $\mu$m OD single-mode fiber, its zero dispersion wavelength would be 1570 nm. Both core preforms are stretched to a diameter slightly less than 7.5 mm. The first stretched preform is cut into tablets 250, and the second stretched preform is cut into tablets 252 that preferably have the same length as tablets 250. The tablets are made by the simple score and snap method.

A short length 264 of capillary tubing is fused to one end of a silica tube 266 having an inside diameter (ID) of 7.5 mm and an O.D. of 9 mm. Tube 266 is overclad with silica particles by the method of FIG. 10b to form a porous silica coating 268. Layer 268 is built up to a sufficient OD that the resultant preform can be consolidated and drawn into a 125 $\mu$m OD single-mode fiber. Tablets 250 and 252 are alternately inserted into tube 266. Tube 270 is fused to the end of tube 266 opposite tube 264. Tube 270 is part of a ball joint type gas feed system of the type disclosed in U.S. Pat. No. 5,180,410.

The resultant assembly 272 is suspended in a consolidation furnace. While assembly 272 is rotated at 1 rpm, it is lowered into consolidation furnace muffle 274 at a rate of 5 mm per minute. A gas mixture comprising 50 sccm chlorine and 40 slpm helium flows upwardly through the muffle. Chlorine (arrow 276 flows downwardly around tablets 250 and 252 and exhausts through tube 264. A centerline flow of 0.3 slpm chlorine is suitable. The maximum temperature in the consolidation furnace is about 1450° C. As assembly 272 moves downwardly into the furnace, it is subjected to a sufficiently high temperature that the centerline chlorine flow chemically cleans the adjacent surfaces of tablets 250 and 252 and tube 266. As assembly 272 moves further into the furnace muffle, tube 264 fuses and cuts off the centerline chlorine flow. A valve is then switched to pull a vacuum within tube 266. As assembly 272 continues its movement into the furnace muffle, first its tip and then the remainder of the assembly is subjected to the maximum furnace temperature which is sufficient to consolidate coating 268. During consolidation of coating 268, tube 266 is forced inwardly against tablets 250 and 252, and the contacting surfaces become fused.

The fused assembly is removed from the consolidation furnace and is drawn to form a dispersion managed optical fiber having an OD of 125 $\mu$m.

Single-mode dispersion managed optical fibers made by the foregoing process have been drawn without upsets; attenuation has typically been 0.21 dB/km. The two different types of tablets that were employed in the fiber making process combined to provide a zero dispersion wavelength of 1550 nm. The oscillation lengths and the period are controlled by the lengths of the core preform tablets. Fibers having oscillation lengths of 1.2 to 2.5 km have been drawn.

Thus a waveguide fiber and methods for making a waveguide which meets the requirements of a high data rate, high power, multiplexed system have been disclosed and described. Although particular embodiments of the invention have been discussed in detail, the invention is nevertheless limited only by the following claims.

What is claimed is:

1. A dispersion managed single-mode optical waveguide fiber comprising:
    a core glass region, having a refractive index profile, surrounded by a clad glass layer, said clad layer having a refractive index, $n_c$, lower than at least a portion of the refractive index profile of said core glass region;

said single-mode waveguide fiber having a varying total dispersion, which changes in sign, from positive to negative and negative to positive, along the length of said waveguide.

2. The fiber of claim 1, wherein sub-length, $l_i$, of said waveguide fiber is made up of segments, $dl_i$, each $dl_i$ having an associated, essentially constant, total dispersion, $D_i$, wherein $D_i$ lies in a first range of values of a pre-selected sign, and $l_i$ is characterized by the sum of products, $D_i \, dl_i$, sub-length, $l_j$, of said waveguide fiber is made up of segments, $dl_j$, each $dl_j$ having an associated, essentially constant, total dispersion, $D_j$, wherein $D_j$ lies in a second range of values of sign opposite to that of $D_i$, and $l_j$ is characterized by the sum of products, $D_j \, dl_j$, and, transition lenghts $l_t$ are provided over which the total dispersion changes from a value in the first range of dispersion values to a value in the second range of dispersion values, wherein the sum of all $l_i$, all $l_j$, and all $l_t$ sub-lengths is equal to the waveguide fiber length, and, the algebraic sum of all products $dl_i \, D_i$ and $dl_j \, D_j$ is less than a pre-selected value, over a pre-determined wavelength range R.

3. The single-mode waveguide fiber of claim 2 wherein said total dispersions, $D_i$ and $D_j$, each have a magnitude in the range of about 0.5 to 20 ps/nm-km.

4. The fiber of claim 2, wherein the pre-determined wavelength range R is about 1525 nm to 1565 nm, and the pre-selected value of the algebraic sum of products is essentially zero.

5. The single-mode waveguide fiber of claim 2, wherein said sub-lengths, $l_i$ and $l_j$, are each greater than about 0.1 km.

6. The single-mode waveguide fiber of claim 2 wherein any one of said transition length, $l_t$, has a sub-length $l_s$ less than about 500 meters over which the magnitude of total dispersion is less than about 0.5 ps/nm-km.

7. The single-mode waveguide fiber of claim 2 wherein said core region has a radius, defined as the distance between the centerline of said waveguide fiber and the interface of said core region and said clad layer, and, wherein;

said segment $dl_i$ has an associated radius $r_i$, wherein $r_i$ is in a first pre-selected range, said segment $dl_j$ has an associated radius $r_j$, wherein $r_j$ is in a second pre-selected range, and, said transition length has a radius which changes from a value, $r_i$, in the first pre-selected range to a value, $r_j$, in the second pre-selected range, and, wherein each $r_i$ differs from each $r_j$ by an amount in the range of about 5% to 25%.

8. The single-mode waveguide fiber of claim 2 wherein;

said segment $dl_i$, has a light guiding region characterized by a maximum refractive index $n_i$, wherein $n_i$ lies within a first pre-selected range of refractive index values, said segment $dl_j$, has a light guiding region characterized by a maximum refractive index $n_j$, and, the difference between each $n_i$ and each $n_j$ is at least about $5 \times 10^{-6}$.

9. The single-mode waveguide fiber of claim 8 wherein the difference between each $n_i$ and each $n_j$ is at least about $1 \times 10^{-3}$.

10. The single-mode optical waveguide fiber of claim 1 wherein said core glass region includes a central portion, having a first index profile and at least one annular portion, adjacent said central portion, having a second index profile.

11. The single-mode optical waveguide fiber of claim 10 wherein said first index profile is an alpha profile.

12. The single-mode optical waveguide fiber of claim 10 wherein said first index profile is constant and substantially equal to $n_c$ and said adjacent profile has a rounded step index shape and a maximum refractive index $n_i > n_c$.

13. The single-mode optical waveguide fiber of claim 10 wherein said adjacent profile is an annulus, having an inner radius $a_1$ and an outer radius a, said radii measured from the centerline of said waveguide fiber to the inner and outer edge, respectively, of said annulus, and $a_1/a$ is about 0.5, and the maximum % index delta of said rounded step index is about 1.0%.

14. A method of making a dispersion managed single-mode optical waveguide fiber comprising the steps:

providing a fiber preform having alternating glass regions along its length such that, when drawn into a fiber the alternating glass region result in a single-mode waveguide fiber having a varying total dispersion, which changes in sign, from positive to negative and negative to positive, along the length of said waveguide; and drawing a waveguide fiber from said preform.

15. The method of claim 14, wherein said providing a fiber step comprises:

providing a core preform having a length, at least one preselected sublength of said core preform having a relatively large diameter and at least one pre-selected sublength of said core preform having a smaller diameter than said relatively large diameter; and overcladding said core preform to yield a draw blank having a substantially uniform cylindrical shape.

16. The method of claim 15 wherein the step of providing a core preform comprises providing a preform consisting entirely of core glass.

17. The method of claim 15 wherein said core preform has a step index profile.

18. The method of claim 15 wherein the step of providing a core preform comprises providing a preform having a central core region surrounded by a layer of cladding glass.

19. The method of claim 15 wherein the step of overcladding comprises depositing glass particles on the surface of said core preform and sintering said particles to form a dense, clear glass cladding.

20. The method of claim 19 wherein the step of sintering results in the formation of glass cladding having a given diameter over the relatively large diameter portion of said core preform and a diameter smaller than said given diameter over the smaller diameter portion of said core preform, said method further comprising the step of reducing the diameter of the portions of said cladding glass surrounding the relatively large diameter portions of said core preform to form a draw blank having a substantially constant diameter cladding layer.

* * * * *